US012095178B2

(12) United States Patent
Leung et al.

(10) Patent No.: US 12,095,178 B2
(45) Date of Patent: Sep. 17, 2024

(54) MULTI-POLARIZATION ANTENNA AND MULTI-POLARIZATION ANTENNA ARRAY

(71) Applicant: City University of Hong Kong, Kowloon (HK)

(72) Inventors: Kwok Wa Leung, Kowloon (HK); Chen Yang, Kowloon (HK); Kai Lu, Guangdong (CN)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 18/162,845

(22) Filed: Feb. 1, 2023

(65) Prior Publication Data

US 2024/0258695 A1 Aug. 1, 2024

(51) Int. Cl.
*H01Q 5/392* (2015.01)
*H01Q 19/00* (2006.01)

(52) U.S. Cl.
CPC .......... *H01Q 5/392* (2015.01); *H01Q 19/005* (2013.01)

(58) Field of Classification Search
CPC .. H01Q 5/20; H01Q 5/28; H01Q 5/30; H01Q 5/307; H01Q 5/392; H01Q 5/40; H01Q 5/49–50; H01Q 21/24; H01Q 19/005; H01Q 1/52; H01Q 1/521; H01Q 1/523
See application file for complete search history.

(56) References Cited

U.S. PATENT DOCUMENTS

2009/0096699 A1 4/2009 Chiu
2011/0298679 A1 12/2011 Elliot
2016/0372839 A1* 12/2016 Watson .................... H01Q 9/42
2018/0013209 A1* 1/2018 Hung ..................... H01Q 21/28
2018/0175515 A1* 6/2018 Boutayeb ............... H01Q 21/30
2019/0221948 A1* 7/2019 Ramirez .................. H01Q 9/30
(Continued)

FOREIGN PATENT DOCUMENTS

| | | | |
|---|---|---|---|
| CN | 110854529 | A | 2/2020 |
| CN | 111293426 | A | 6/2020 |
| WO | 2017/076030 | A1 | 5/2017 |

OTHER PUBLICATIONS

Y. Yifei and Z. Longming, "Application scenarios and enabling technologies of 5G," China Commun., vol. 11, No. 11, pp. 69-79, Nov. 2014.

(Continued)

*Primary Examiner* — Jason M Crawford
(74) *Attorney, Agent, or Firm* — Renner, Kenner, Greive, Bobak, Taylor & Weber

(57) ABSTRACT

A multi-polarization antenna includes a plurality of antenna elements and a dielectric arrangement operably coupled with the plurality of antenna elements. The dielectric arrangement is arranged to cooperate with the plurality of antenna elements to (i) facilitate transmission and/or receive of, at least, electromagnetic waves with a first polarization, electromagnetic waves with a second polarization different from the first polarization, and electromagnetic waves with a third polarization different from the first polarization and the second polarization, and (ii) reduce, limit, and/or eliminate mutual coupling between at least some of the plurality of antenna elements during operation. The first, second, and third polarizations are non-orthogonal.

16 Claims, 26 Drawing Sheets

(56) References Cited

U.S. PATENT DOCUMENTS

2022/0384950 A1* 12/2022 Leung .................... H01Q 5/35
2023/0299819 A1* 9/2023 Zhu ....................... H01Q 21/20 375/267

OTHER PUBLICATIONS

S. Deshpande, "Appendix B: Introduction to MIMO and Massive MIMO," in Fundamentals of Network Planning and Optimisation 2G/3G/4G, Chichester, UK: John Wiley & Sons, Ltd, 2018, pp. 325-335.
K. Chen, S. Zhang, and Q. Li, "A Review of Mutual Coupling in MIMO Systems," IEEE Access, vol. 6, p. 24706-24719, 2018.
S. S. Jehangir and M. S. Sharawi, "A Compact Single-Layer Four-Port Orthogonally Polarized Yagi-Like MIMO Antenna System," IEEE Trans. Antennas Propag., vol. 68, No. 8, pp. 6372-6377, Aug. 2020.
F. Quitin, C. Oestges, A. Panahandeh, F. Horlin, and P. De Doncker, "Tri-polarized MIMO systems in real-world channels: Channel investigation and performance analysis," Phys. Commun., vol. 5, No. 4, pp. 308-316, Dec. 2012.
W. Wang et al., "Compact Quad-Element Vertically-Polarized High-Isolation Wideband MIMO Antenna for Vehicular Base Station," IEEE Trans. Veh. Technol., vol. 69, No. 9, pp. 10000-10008, Sep. 2020.
M. R. Andrews, P. P. Mitra, and R. deCarvalho, "Tripling the capacity of wireless communications using electromagnetic polarization," Nature, vol. 409, No. 6818, pp. 316-318, Jan. 2001.
M. C. Mtumbuka and D. J. Edwards, "Investigation of tri-polarised MIMO technique," Electron. Lett., vol. 41, No. 3, p. 137, 2005.
Y. Gao, R. Ma, Y. Wang, Q. Zhang, and C. Parini, "Stacked Patch Antenna With Dual-Polarization and Low Mutual Coupling for Massive MIMO," IEEE Trans. Antennas Propag., vol. 64, No. 10, pp. 4544-4549, Oct. 2016.
J. Wang, Z. Shen, and L. Zhao, "Wideband Dual-Polarized Antenna For Spectrum Monitoring Systems," IEEE Antennas Wirel. Propag. Lett., vol. 16, pp. 2236-2239, 2017.
C.-Y. Chiu, J.-B. Yan, and R. D. Murch, "Compact Three-Port Orthogonally Polarized MIMO Antennas," IEEE Antennas Wirel. Propag. Lett., vol. 6, pp. 619-622, Dec. 2007.
D. Piao, L. Yang, Q. Guo, Y. Mao, and Z. Li, "Measurement-Based Performance Comparison of Colocated Tripolarized Loop and Dipole Antennas," IEEE Trans. Antennas Propag., vol. 63, No. 8, pp. 3371-3379, Aug. 2015.
L. Liu, C. Liu, Z. Li, X. Yin, and Z. N. Chen, "Slit-Slot Line and Its Application to Low Cross-Polarization Slot Antenna and Mutual-Coupling Suppressed Tripolarized MIMO Antenna," IEEE Trans. Antennas Propag., vol. 67, No. 1, pp. 4-15, Jan. 2019.
X. Gao, H. Zhong, Z. Zhang, Z. Feng, and M. F. Iskander, "Low-Profile Planar Tripolarization Antenna for WLAN Communications," IEEE Antennas Wirel. Propag. Lett., vol. 9, pp. 83-86, 2010.
K.-F. Tong, H.-J. Tang, A. Al-Armaghany, and W. Hong, "Low-Profile Orthogonally Tripolarized Antennas," IEEE Antennas Wirel. Propag. Lett., vol. 12, pp. 876-879, 2013.
N. Nguyen-Trong, S. X. Ta, M. Ikram, K. Bertling, and A. M. Abbosh, "A Low-Profile Wideband Tripolarized Antenna," IEEE Trans. Antennas Propag., vol. 67, No. 3, pp. 1946-1951, Mar. 2019.
S. X. Ta, D. M. Nguyen, K. K. Nguyen, C. Dao-Ngoc, and N. Nguyen-Trong, "A Tripolarized Antenna With Ultrawide Operational Bandwidth," IEEE Trans. Antennas Propag., vol. 68, No. 6, pp. 4386-4396, Jun. 2020.
X. S. Fang, K. W. Leung, and K. M. Luk, "Theory and Experiment of Three-Port Polarization-Diversity Cylindrical Dielectric Resonator Antenna," IEEE Trans. Antennas Propag., vol. 62, No. 10, pp. 4945-4951, Oct. 2014.
K. Saurav, N. K. Mallat, and Y. M. M. Antar, "A Three-Port Polarization and Pattern Diversity Ring Antenna," IEEE Antennas Wirel. Propag. Lett., vol. 17, No. 7, pp. 1324-1328, Jul. 2018.
D. Piao and Y. Wang, "Tripolarized MIMO Antenna Using a Compact Single-Layer Microstrip Patch," IEEE Trans. Antennas Propag., vol. 67, No. 3, pp. 1937-1940, Mar. 2019.
K.-L. Wong, C.-M. Chou, Y.-J. Yang, and K.-Y. Wang, "Multipolarized Wideband Circular Patch Antenna for Fifth-Generation Multi-Input-Multi-Output Access-Point Application," IEEE Antennas Wirel. Propag. Lett., vol. 18, No. 10, pp. 2184-2188, Oct. 2019.
K.-L. Wong, H.-J. Chang, J.-Z. Chen, and K.-Y. Wang, "Three Wideband Monopolar Patch Antennas in a Y-Shape Structure for 5G Multi-Input-Multi-Output Access Points," IEEE Antennas Wirel. Propag. Lett., vol. 19, No. 3, pp. 393-397, Mar. 2020.
J. P. Doane, K. Sertel, and J. L. Volakis, "A Wideband, Wide Scanning Tightly Coupled Dipole Array With Integrated Balun (TCDA-IB)," IEEE Trans. Antennas Propag., vol. 61, No. 9, pp. 4538-4548, Sep. 2013.
A. Hovsepian, E. A. Alwan, and J. L. Volakis, "Wideband scanning array of spiral antennas for simultaneous transmit and receive (STAR)," in 2017 IEEE International Symposium on Antennas and Propagation & USNC/URSI National Radio Science Meeting, San Diego, CA, USA, Jul. 2017, pp. 487-488.
J. Zhu and G. V. Eleftheriades, "A Simple Approach for Reducing Mutual Coupling in Two Closely Spaced Metamaterial-Inspired Monopole Antennas," IEEE Antennas Wirel. Propag. Lett., vol. 9, pp. 379-382, 2010.
M. Alibakhshikenari et al., "Isolation enhancement of densely packed array antennas with periodic MTM-photonic bandgap for SAR and MIMO systems," IET Microw. Antennas Propag., vol. 14, No. 3, pp. 183-188, Feb. 2020.
L. Sun, Y. Li, Z. Zhang, and H. Wang, "Self-Decoupled MIMO Antenna Pair With Shared Radiator for 5G Smartphones," IEEE Trans. Antennas Propag., vol. 68, No. 5, pp. 3423-3432, May 2020.
J. Sui, Y. Dou, X. Mei, and K.-L. Wu, "Self-Curing Decoupling Technique for MIMO Antenna Arrays in Mobile Terminals," IEEE Trans. Antennas Propag., vol. 68, No. 2, pp. 838-849, Feb. 2020.
S. M. Amjadi and K. Sarabandi, "Mutual Coupling Mitigation in Broadband Multiple-Antenna Communication Systems Using Feedforward Technique," IEEE Trans. Antennas Propag., vol. 64, No. 5, pp. 1642-1652, May 2016.
S. Farsi, H. Aliakbarian, D. Schreurs, B. Nauwelaers, and G. A. E. Vandenbosch, "Mutual Coupling Reduction Between Planar Antennas by Using a Simple Microstrip U-Section," IEEE Antennas Wirel. Propag. Lett., vol. 11, pp. 1501-1503, 2012.
C. Lu, Q. Zhang, H. Qi, S. Li, H. Zhao, and X. Yin, "Compact Postwall Slotline-Based Stepped Impedance Resonator Decoupling Structure for Isolation Enhancement of Patch Antenna Array," IEEE Antennas Wirel. Propag. Lett., vol. 18, No. 12, pp. 2647-2651, Dec. 2019.
D. Gao, Z.-X. Cao, S.-D. Fu, X. Quan, and P. Chen, "A Novel Slot-Array Defected Ground Structure for Decoupling Microstrip Antenna Array," IEEE Trans. Antennas Propag., vol. 68, No. 10, pp. 7027-7038, Oct. 2020.
C. Wei, Z.-Y. Zhang, and K.-L. Wu, "Phase Compensation for Decoupling of Large-Scale Staggered Dual-Polarized Dipole Array Antennas," IEEE Trans. Antennas Propag., vol. 68, No. 4, pp. 2822-2831, Apr. 2020.
A. Dadgarpour, B. Zarghooni, B. S. Virdee, T. A. Denidni, and A. A. Kishk, "Mutual Coupling Reduction in Dielectric Resonator Antennas Using Metasurface Shield for 60-GHz MIMO Systems," IEEE Antennas Wirel. Propag. Lett., vol. 16, pp. 477-480, 2017.
G. Zhai, Z. N. Chen, and X. Qing, "Enhanced Isolation of a Closely Spaced Four-Element MIMO Antenna System Using Metamaterial Mushroom," IEEE Trans. Antennas Propag., vol. 63, No. 8, pp. 3362-3370, Aug. 2015.
M. Li, L. Jiang, and K. L. Yeung, "A Novel Wideband Decoupling Network for Two Antennas Based on the Wilkinson Power Divider," IEEE Trans. Antennas Propag., vol. 68, No. 7, pp. 5082-5094, Jul. 2020.
M. Li, L. Jiang, and K. L. Yeung, "A General and Systematic Method to Design Neutralization Lines for Isolation Enhancement in MIMO Antenna Arrays," IEEE Trans. Veh. Technol., vol. 69, No. 6, pp. 6242-6253, Jun. 2020.

(56) References Cited

OTHER PUBLICATIONS

R. Tian, B. K. Lau, and Z. Ying, "Multiplexing Efficiency of MIMO Antennas," IEEE Antennas Wirel. Propag. Lett., vol. 10, pp. 183-186, 2011.
J. Zhu, S. Li, S. Liao, and Q. Xue, "Wideband Low-Profile Highly Isolated MIMO Antenna With Artificial Magnetic Conductor," IEEE Antennas Wirel. Propag. Lett., vol. 17, No. 3, pp. 458-462, Mar. 2018.
D. Tse and P. Viswanath, Fundamentals of Wireless Communication, 1st ed. Cambridge University Press, 2005.
A. Goldsmith, S. A. Jafar, N. Jindal, and S. Vishwanath, "Capacity limits of MIMO channels," IEEE J. Sel. Areas Commun., vol. 21, No. 5, pp. 684-702, Jun. 2003.
W. Hong, K.-H. Baek, and S. Ko, "Millimeter-Wave 5G Antennas for Smartphones: Overview and Experimental Demonstration," IEEE Trans. Antennas Propag., vol. 65, No. 12, pp. 6250-6261, Dec. 2017.
I. Y. Kelly and M. Zimmerman, "Base Station Antenna Selection for LTE Networks," p. 8.
K. W. Leung, E. H. Lim, and X. S. Fang, "Dielectric Resonator Antennas: From the Basic to the Aesthetic," Proc. IEEE, vol. 100, No. 7, pp. 2181-2193, Jul. 2012.

* cited by examiner

MULTI-POLARIZATION ANTENNA AND MULTI-POLARIZATION ANTENNA ARRAY

TECHNICAL FIELD

The invention relates to multi-polarization antennas and multi-polarization antenna arrays. The antenna and antenna arrays may be used for multi-input-multi-output application(s).

BACKGROUND

Wireless communications technologies can be used in various applications such as high-definition (HD) video, virtual reality (VR)/augmented reality (AR), industrial Internet of Things, autonomous driving, telemedicine, etc. Some of these applications may require wireless communications technologies that can provide, e.g., high speed, low latency, wide coverage, etc.

Multi-input-multi-output (MIMO) techniques are known and can be used in multiple-antenna systems to improve speed. An example MIMO technique is spatial multiplexing technique, in which multiple independent channels are used for multiple data streams to increase data transmit and/or receive rate. Polarization multiplexing is one form of spatial multiplexing technique that can be used to increase the channel capacity. FIG. 1 illustrates a general concept of polarization multiplexing, and shows evolution from single-polarization to multi-polarization such as (±45°) dual-polarization and tri-polarization (e.g., co-located or co-planar). Some examples of co-located tri-polarization antenna can be found in Fang et al., "Theory and Experiment of Three-Port Polarization-Diversity Cylindrical Dielectric Resonator Antenna" (2014) and Piao et al., "Tripolarized MIMO Antenna Using a Compact Single-Layer Microstrip Patch" (2019). Some examples of co-planar tri-polarization antenna can be found in Wong et al., "Multipolarized Wideband Circular Patch Antenna for Fifth-Generation Multi-Input-Multi-Output Access-Point Application" (2019) and Wong et al., "Three Wideband Monopolar Patch Antennas in a Y-Shape Structure for 5G Multi-Input-Multi-Output Access Points" (2020).

Compared to a single-polarization antenna, a dual-polarization antenna can double the channel/communication capacity whereas a tri-polarization antenna can triple the channel/communication capacity. Problematically, however, existing multi-polarization antennas may suffer from one or more of the following problems: cannot provide desirable radiation pattern(s) for all polarization states or senses, not suitable for use in antenna arrays (e.g., for long-distance communications), bulky and/or structurally-complicated hence cannot be easily integrated into some devices/systems, etc.

SUMMARY OF THE INVENTION

In a first aspect, there is provided a multi-polarization antenna comprising a plurality of antenna elements and a dielectric arrangement operably coupled with the plurality of antenna elements. The dielectric arrangement is arranged to cooperate with the plurality of antenna elements to (i) facilitate transmission and/or receive of, at least, electromagnetic waves with a first polarization, electromagnetic waves with a second polarization different from the first polarization, and electromagnetic waves with a third polarization different from the first polarization and the second polarization, and (ii) reduce, limit, and/or eliminate mutual coupling between at least some of the plurality of antenna elements during operation. The multi-polarization antenna may be used for multi-input-multi-output application(s). The plurality of antenna elements may operate as antenna elements if or when they transmit electromagnetic waves. The multi-polarization antenna can be used for transmission and/or reception of polarization diverse electromagnetic waves. The plurality of antenna elements may include or may be electrically conductive elements. The multi-polarization antenna can be, e.g., a tri-polarization antenna, a quad-polarization antenna, a penta-polarization antenna, a hexa-polarization antenna, etc. The first, second, and third polarizations are non-orthogonal.

Preferably, the first, second, and third polarizations are generally co-planar and spaced apart. In some examples, the first, second, and third polarizations may be spaced apart by about 120 degrees. The first, second, and third polarizations may be linear polarizations.

Optionally, the plurality of antenna elements comprise, or consist only of, a first antenna element, a second antenna element, and a third antenna element; and the dielectric arrangement is arranged to: cooperate with the first antenna element to facilitate transmission and/or receive of electromagnetic waves with the first polarization, cooperate with the second antenna element to facilitate transmission and/or receive of electromagnetic waves with the second polarization, cooperate with the third antenna element to facilitate transmission and/or receive of electromagnetic waves with the third polarization, and reduce, limit, and/or eliminate mutual coupling between at least two or any two of the first, second, and third antenna elements.

Optionally, the dielectric arrangement comprises, or consists only of, a dielectric member surrounding or receiving each of the plurality of antenna elements. The dielectric member may be a dielectric block.

Optionally, the dielectric member comprises a plurality of openings each at least partly surrounding or receiving a respective one of the plurality of antenna elements. For example, the dielectric member may comprise a first opening surrounding or receiving partly or substantially entirely the first antenna element, a second opening surrounding or receiving partly or substantially entirely the second antenna element, and a third opening surrounding or receiving partly or substantially entirely the third antenna element. The plurality of openings are spaced apart. The plurality of openings may be through-holes or blind-holes. The plurality of openings may have generally the same shape and/or size.

Optionally, the dielectric member comprises, or consists only of, a generally cylindrical dielectric block with a plurality of openings each at least partly surrounding or receiving a respective one of the plurality of antenna elements.

Optionally, the plurality of antenna elements are arranged on and angularly spaced apart on an imaginary circle (path). Optionally, the plurality of antenna elements angularly spaced apart generally equally. If the plurality of antenna elements consists only of the first, second, and third antenna elements, then the antenna elements are angularly spaced apart by about 120 degrees.

Optionally, the imaginary circle and a further imaginary circle defined by a base of the generally cylindrical dielectric block are generally concentric (in plan view).

Optionally, the generally cylindrical dielectric block has a diameter of between about $0.3\lambda_0$ to about $0.6\lambda_0$, between about $0.3\lambda_0$ to about $0.5\lambda_0$, less than $0.6\lambda_0$, about $0.6\lambda_0$, less than $0.5\lambda_0$, about $0.5\lambda_0$, less than $0.4\lambda_0$, about $0.4\lambda_0$, or about $0.3\lambda_0$, where $\lambda_0$ is wavelength of center operation frequency of the multi-polarization antenna in free space.

Each respective one of the plurality of antenna elements may include or consist only of a monopole element, a dipole element, a slot, a patch element, etc. Optionally, each respective one of the plurality of antenna elements comprises a monopole element. Optionally, the monopole element is arranged to operate in one or more monopole modes, including at least one of a quarter-wavelength monopole mode and a half-wavelength monopole mode. Each respective one of the plurality of antenna elements may be shaped as a cylinder, a prism, etc. The cylinder may be a right cylinder. The cylinder may be a circular cylinder, an elliptic cylinder, a parabolic cylinder, a hyperbolic cylinder, etc. The prism may be a right prism. The prism may be a triangular prism, a rectangular prism, cube, a polygonal prism, etc. The plurality of antenna elements may or may not have generally the same shape and/or size.

The first antenna element may include or consist only of a monopole element, a dipole element, a slot, a patch element, etc. Optionally, the first antenna element comprises a monopole element. Optionally, the monopole element is arranged to operate in one or more monopole modes, including at least one of a quarter-wavelength monopole mode and a half-wavelength monopole mode. The first antenna element may be shaped as a cylinder, a prism, etc. The cylinder may be a right cylinder. The cylinder may be a circular cylinder, an elliptic cylinder, a parabolic cylinder, a hyperbolic cylinder, etc. The prism may be a right prism. The prism may be a triangular prism, a rectangular prism, cube, a polygonal prism, etc.

The second antenna element may include or consist only of a monopole element, a dipole element, a slot, a patch element, etc. Optionally, the second antenna element comprises a monopole element. Optionally, the monopole element is arranged to operate in one or more monopole modes, including at least one of a quarter-wavelength monopole mode and a half-wavelength monopole mode. The second antenna element may be shaped as a cylinder, a prism, etc. The cylinder may be a right cylinder. The cylinder may be a circular cylinder, an elliptic cylinder, a parabolic cylinder, a hyperbolic cylinder, etc. The prism may be a right prism. The prism may be a triangular prism, a rectangular prism, cube, a polygonal prism, etc.

The third antenna element may include or consist only of a monopole element, a dipole element, a slot, a patch element, etc. Optionally, the third antenna element comprises a monopole element. Optionally, the monopole element is arranged to operate in one or more monopole modes, including at least one of a quarter-wavelength monopole mode and a half-wavelength monopole mode. The third antenna element may be shaped as a cylinder, a prism, etc. The cylinder may be a right cylinder. The cylinder may be a circular cylinder, an elliptic cylinder, a parabolic cylinder, a hyperbolic cylinder, etc. The prism may be a right prism. The prism may be a triangular prism, a rectangular prism, cube, a polygonal prism, etc.

Optionally, the multi-polarization antenna further comprises a ground plane, and the dielectric arrangement (or the dielectric member) is arranged on the ground plane.

Optionally, each of the plurality of antenna elements extend generally perpendicular to the ground plane.

In some examples, a height of the dielectric member with respect to the ground plane is higher than each respective height of the plurality of antenna elements with respect to the ground plane. In some other examples, a height of the dielectric member with respect to the ground plane is lower than each respective height of the plurality of antenna elements with respect to the ground plane. In some further examples, a height of the dielectric member with respect to the ground plane is generally equal to each respective height of the plurality of antenna elements with respect to the ground plane. Optionally, the plurality of antenna elements have generally the same height with respect to the ground plane.

Optionally, in plan view the dielectric member is arranged centrally of the ground plane.

Optionally, the ground plane is provided on or by a generally cylindrical substrate. The substrate may be made partly or entirely of metal(s). The substrate may be in the form of a disc.

Optionally, the dielectric member has a first shape and a first size in plan view, and the ground plane has a second shape and a second size in plan view. The first and second shapes may be generally the same in plan view. For example, the first and second shapes can be rectangle, circle, square, triangle, polygon, irregular, etc., in plan view. The second size may be larger than the first size in plan view.

Optionally, each of the plurality of antenna elements are arranged partly or substantially entirely on the ground plane.

Optionally, the multi-polarization antenna further comprises a feed arrangement operably coupled with the plurality of antenna elements. Optionally, the feed arrangement comprises a plurality of feeds each operably coupled with a respective one of the plurality of antenna elements. Optionally, the plurality of feeds are selectively operable. Optionally, the plurality of feeds are independently operable. Optionally, at least two of the plurality of feeds are simultaneously operable.

In a second aspect, there is provided a multi-polarization antenna array comprising one or more (preferably multiple ones) of the multi-polarization antenna of the first aspect. The multi-polarization antenna array may or may not include one or more other antennas (different from the multi-polarization antennas of the first aspect). The one or more multi-polarization antennas of the first aspect and optionally the one or more other antennas may be arranged in an array. The multi-polarization antenna array may be used for multi-input-multi-output application(s). The multi-polarization antenna array can be used for transmission and/or reception of polarization diverse electromagnetic waves.

Optionally, the multi-polarization antenna array includes a plurality of the multi-polarization antennas of the first aspect. The plurality of the multi-polarization antennas may be arranged in an array. The array may, e.g., have a generally polygonal configuration. In one example, the generally polygonal configuration is a hexagonal configuration with six multi-polarization antennas arranged around a center multi-polarization antenna. In another example, the generally polygonal configuration is a hexagonal configuration with a center multi-polarization antenna, six multi-polarization antennas arranged around the center multi-polarization antenna, and further multi-polarization antennas arranged around the six multi-polarization antennas.

Preferably, for each respective one of the multi-polarization antennas, the first, second, and third polarizations are generally co-planar and spaced apart. In some examples, the first, second, and third polarizations of one or more of the multi-polarization antennas may be spaced apart by about 120 degrees.

Preferably, the first polarizations of all of the multi-polarization antennas in the array are generally the same first polarization; the second polarizations of all of the multi-polarization antennas in the array are generally the same second polarization; and the third polarizations of all of the multi-polarization antennas in the array are generally the same third polarization. In some examples, the first polarizations of all of the multi-polarization antennas in the array are linear polarizations; the second polarizations of all of the multi-polarization antennas in the array are linear polarizations; and the third polarizations of all of the multi-polarization antennas in the array are linear polarizations.

Optionally, the multi-polarization antenna array further comprises a ground plane, and the dielectric arrangements (e.g., dielectric members, dielectric blocks, etc.) of the plurality of multi-polarization antennas are arranged on the ground plane. The dielectric arrangements (e.g., dielectric members, dielectric blocks, etc.) of the multi-polarization antennas are preferably spaced apart.

Optionally, the multi-polarization antenna array further comprises a further dielectric arrangement operably coupled with the plurality of multi-polarization antennas to reduce, limit, and/or eliminate mutual coupling between at least two or any two of the plurality of multi-polarization antennas during operation.

Optionally, the further dielectric arrangement comprises a plurality of dielectric elements arranged in or on the ground plane. In some examples, the further dielectric arrangement may be considered as a defected ground structure.

Optionally, the plurality of dielectric elements comprise a plurality of first dielectric elements arranged in or on the ground plane and disposed between adjacent ones of the multi-polarization antennas. Optionally, each of the plurality of first dielectric elements comprises a slot arranged in or on the ground plane and one or more dielectric materials received or filled in the slot. Optionally, the plurality of first dielectric elements are arranged such that at least one first dielectric element is disposed between every two adjacent multi-polarization antennas. Optionally, the plurality of first dielectric elements have generally the same shape and/or size. Optionally, each of the plurality of first dielectric elements (and/or its slot) is generally elongated. Optionally, each of the plurality of first dielectric elements (and/or its slot) has a narrowed middle portion and two widened end portions. Optionally, each of the plurality of first dielectric elements (and/or its slot) has a generally bow-tie shape.

Optionally, the plurality of dielectric elements further comprises a plurality of second dielectric elements arranged in or on the ground plane and disposed adjacent to one or more of the plurality of multi-polarization antennas. The plurality of second dielectric elements are different from the plurality of first dielectric elements in terms of shape and/or size. Optionally, each of the plurality of second dielectric elements comprises a slot arranged in or on the ground plane and one or more dielectric materials received or filled in the slot. Optionally, the plurality of second dielectric elements are arranged such that at least two second dielectric elements are respectively disposed adjacent to each of one or more of the plurality of multi-polarization antennas. Optionally, the plurality of second dielectric elements have generally the same shape and/or size. Optionally, each of the plurality of second dielectric elements (and/or its slot) is generally elongated. Preferably, each of the plurality of second dielectric elements (and/or its slot) is longer than each of the first dielectric elements (and/or its slot). Optionally, each of the plurality of second dielectric elements (and/or its slot) has a narrowed middle portion and two widened end portions. Optionally, each of the plurality of second dielectric elements (and/or its slot) has a generally bow-tie shape.

Optionally, the multi-polarization antenna array further comprises an artificial magnetic conductor structure arranged on a side of the ground plane opposite the dielectric arrangements of the multi-polarization antennas. The artificial magnetic conductor structure may be spaced apart from the ground plane. The artificial magnetic conductor structure may be generally parallel to the ground plane.

Optionally, the artificial magnetic conductor structure comprises: a substrate with a first side closer to the ground plane and a second side opposite the first side and further away from the ground plane, an electrically conductive ground arranged on the second side of the substrate, and a plurality of electrically conductive patches arranged on the first side of the substrate. Optionally, each of the plurality of electrically conductive patches comprises a generally polygonal (e.g., hexagonal) patch. The shape of the patch may generally match with the shape of the array configuration. Optionally, the artificial magnetic conductor structure defines a plurality of unit cells each including a respective one of the plurality of electrically conductive patches (and corresponding substrate and electrically conductive ground portions).

Optionally, the multi-polarization antenna array further comprises a feed arrangement operably coupled with the plurality of antenna elements of the plurality of multi-polarization antennas. The feed arrangement may include a plurality of feeds each operably coupled with one of the antenna elements of each of the plurality multi-polarization antennas. For example, the feed arrangement may include a first feed operably coupled with all first antenna elements of the plurality of multi-polarization antennas, a second feed operably coupled with all second antenna elements of the plurality of multi-polarization antennas, a third feed operably coupled with all third antenna elements of the plurality of multi-polarization antennas, etc.

In a third aspect, there is provided a (larger-scale) multi-polarization antenna array with multiple multi-polarization antenna arrays of the second aspect. The multi-polarization antenna array can be used for transmission and/or reception of polarization diverse electromagnetic waves.

In a fourth aspect, there is provided a multi-input-multi-output (MIMO) system with at least one of the multi-polarization antenna of the first aspect. The MIMO system may be a MIMO communication system.

In a fifth aspect, there is provided a multi-input-multi-output (MIMO) system with at least one of the multi-polarization antenna array of the second aspect. The MIMO system may be a MIMO communication system.

In a sixth aspect, there is provided a multi-input-multi-output (MIMO) system with at least one of the multi-polarization antenna array of the third aspect. The MIMO system may be a MIMO communication system.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

Terms of degree such that "generally", "about", "substantially", or the like, are used, depending on context, to account for manufacture tolerance, degradation, trend, tendency, imperfect practical condition(s), etc. In some examples, when a value is modified by terms of degree, such as "about", such expression may include the stated value±15%, ±10%, ±%, ±2%, or ±1%.

Unless otherwise specified, the terms "connected", "coupled", "mounted" or the like, are intended to encompass both direct and indirect connection, coupling, mounting, etc.

BRIEF DESCRIPTION OF THE DRAWINGS

Embodiments of the invention will now be described, by way of example, with reference to the accompanying drawings in which.

Figure 26:
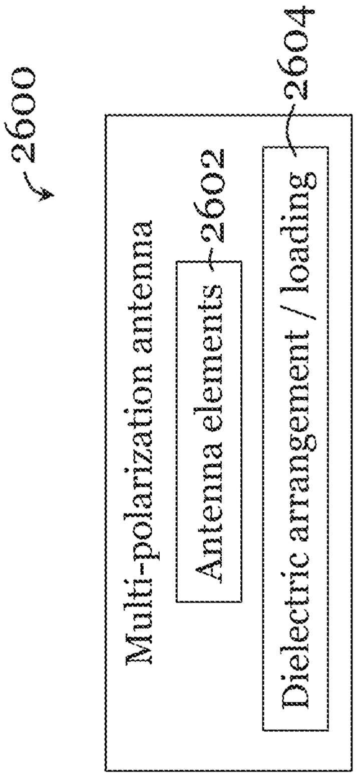
Figure 27:
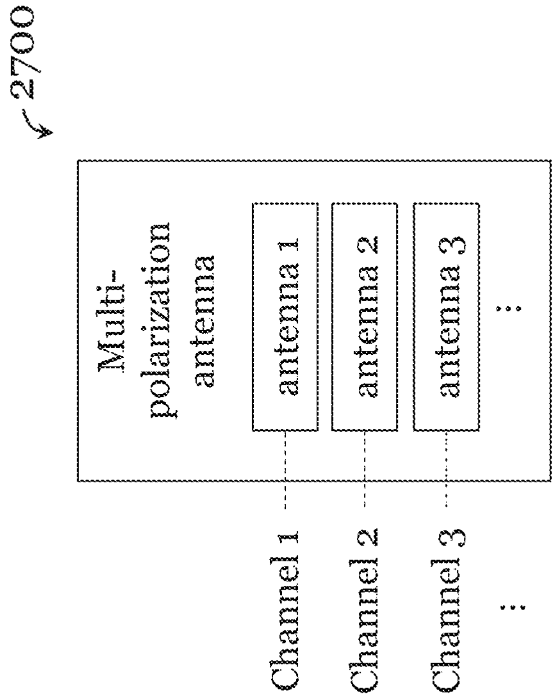

MIMO system, an ideal SISO system, an ideal 2×2 MIMO system, and an ideal 3×3 MIMO system, with an SNR of 20 dB, at different frequencies;

FIG. 26 is a functional block diagram of a multi-polarization antenna of the invention; and FIG. 27 is a functional block diagram of a multi-polarization antenna in some embodiments of the invention.

DETAILED DESCRIPTION

FIG. 26 shows a high-level block diagram of a multi-polarization antenna 2600 of the invention, with only the key component(s) illustrated. The multi-polarization antenna 2600 generally includes, at least, multiple electrically-conductive antenna elements 2602 and a dielectric arrangement (or loading) 2604 for the antenna elements 2602. The dielectric arrangement 2604 is operably coupled with the antenna elements 2602, and is arranged to cooperate with the antenna elements 2602 to facilitate transmission and/or receive of electromagnetic waves with at least three different polarizations and to reduce, limit, and/or eliminate mutual coupling between at least some of the antenna elements 2602 during operation. The multi-polarization antenna 2600 can be used for transmission and/or reception of polarization diverse electromagnetic waves, e.g., for multi-input-multi-output application(s). The multi-polarization antenna 2600 can be used as a transmit-only antenna, a receive-only antenna, or a transmit-and-receive antenna. The multi-polarization antenna 2600 can be a tri-polarization antenna if it is configured to transmit and/or receive electromagnetic waves with three different polarizations. The multi-polarization antenna 2600 can be a high-order-polarization antenna if it is configured to transmit and/or receive electromagnetic waves with more than three different polarizations. The at least three different polarizations are non-orthogonal, and preferably coplanar. The multi-polarization antenna 2600 can be used to form a multi-polarization antenna array that includes multiple ones of the multi-polarization antenna 2600 (or at least one multi-polarization antenna 2600 and at least one other antenna). The multi-polarization antenna array can be used for transmission and/or reception of polarization diverse electromagnetic waves, e.g., for multi-input-multi-output application(s). The multi-polarization antenna array can be used as a transmit-only antenna array, a receive-only antenna array, or a transmit-and-receive antenna array. Example implementations of the multi-polarization antenna 2600 and related antenna array are provided below.

FIG. 27 shows a multi-polarization antenna 2700 in some embodiments of the invention. The multi-polarization antenna 2700, like the multi-polarization antenna 2600, also includes multiple electrically-conductive antenna elements and a dielectric arrangement operably coupled with the antenna elements. In the multi-polarization antenna 2700, the antenna elements and dielectric arrangement (among other things) define multiple antenna units within the multi-polarization antenna 2700 such that the multi-polarization antenna 2700 has multiple integrated antennas units. Each of the antennas units may correspond to a respective communication channel and may be operable to transmit and/or receive electromagnetic waves of a respective polarization state/sense. Any two or more or all of the communication channels, or the antenna units, in the multi-polarization antenna 2700 can be operated selectively or simultaneously, preferably substantially independently. FIG. 27 shows the multi-polarization antenna 2700 with only three antenna units. However, the multi-polarization antenna 2700 can have more than three antenna units each corresponding to a respective communication channel.

Figure 1:
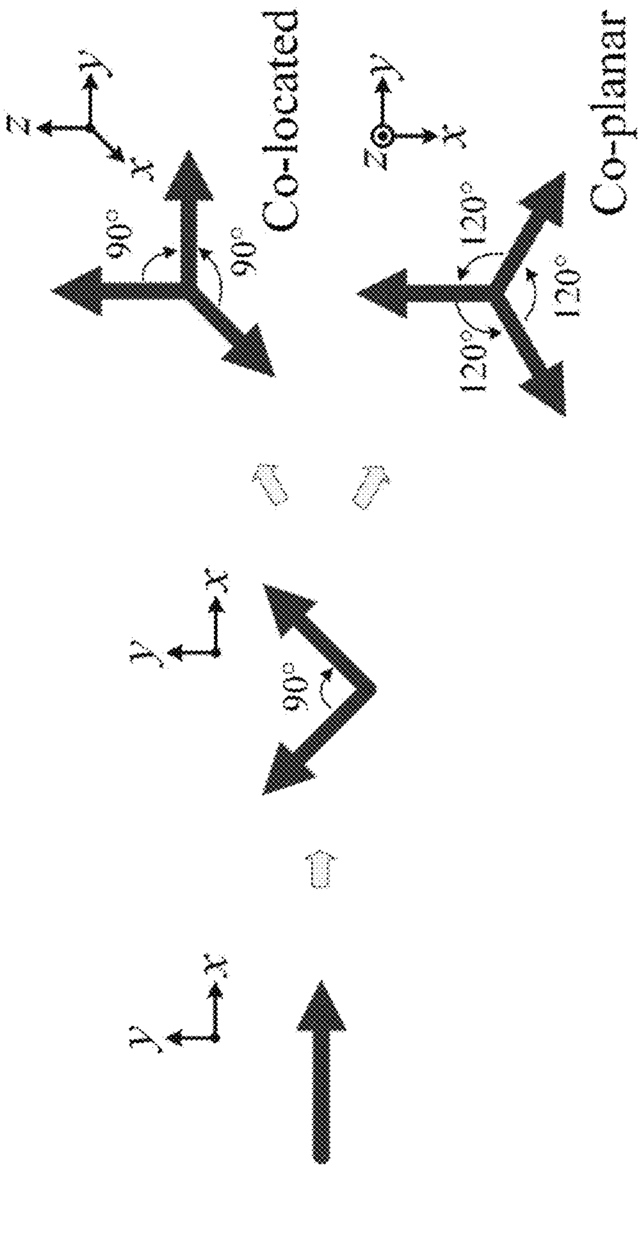
FIG. 1 is a schematic diagram evolution from single polarization to tri-polarization.
Figure 2A:
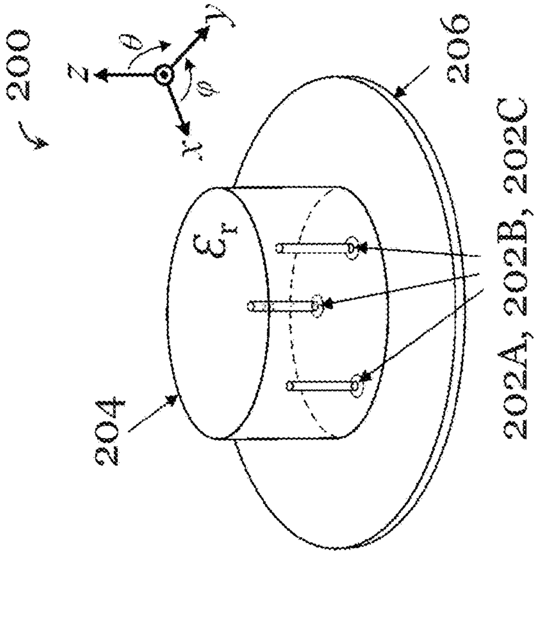
FIG. 2A is a schematic diagram (perspective view) of a multi-polarization antenna in one embodiment of the invention.
Figure 2B:
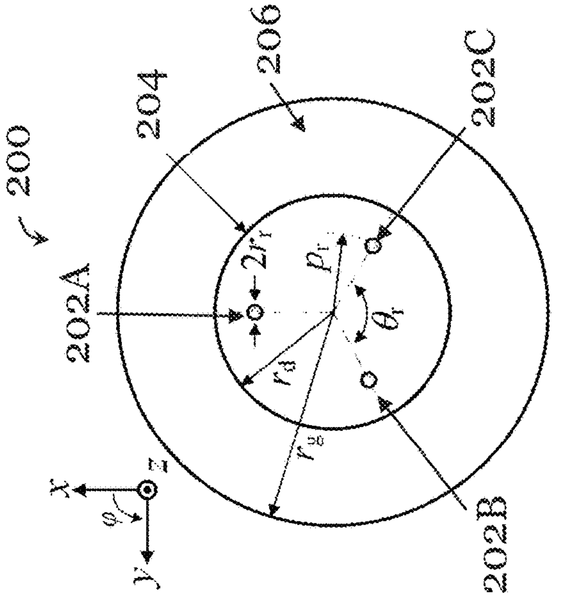
FIG. 2B is a schematic diagram (top view) of the multi-polarization antenna of FIG. 2A.
Figure 2C:
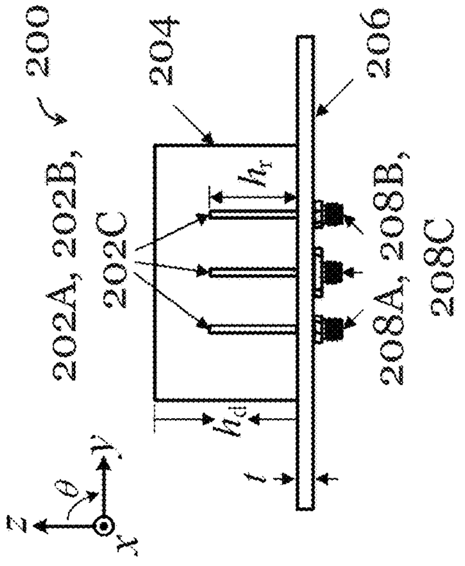
FIG. 2C is a schematic diagram (side view) of the multi-polarization antenna of FIG. 2A.

FIGS. 2A to 2C show a multi-polarization antenna 200 in one embodiment of the invention. The multi-polarization antenna 200 is only an example implementation of the multi-polarization antenna 2600 of FIG. 26.

With reference to FIGS. 2A to 2C, the multi-polarization antenna 200 includes three electrically-conductive antenna elements 202A, 202B, 202C and a dielectric arrangement, in the form of a dielectric block 204, operably coupled with the antenna elements 202A, 202B, 202C. In this embodiment, the multi-polarization antenna 200 is a tri-polarization antenna. The dielectric block 204 is arranged to cooperate with the antenna elements 202A, 202B, 202C to facilitate transmission and/or receive of electromagnetic waves with three different, generally co-planar polarizations, and to reduce, limit, and/or eliminate mutual coupling between at least some of the antenna elements 202A, 202B, 202C during operation. The multi-polarization antenna 200 further includes a ground plane 206 on which the dielectric block 204 is arranged.

The antenna elements 202A, 202B, 202C are each a monopole element operable in one or more monopole modes. In this embodiment, the antenna elements 202A, 202B, 202C are general cylindrical (right cylinder) and are arranged on/above and extend generally perpendicular to the ground plane 206. In this embodiment, the antenna elements 202A, 202B, 202C have generally the same shape and size (including height). In this embodiment, the antenna elements 202A, 202B, 202C have a height $h_r$ and a radius $r_r$, and are provided by probes of three SMA connectors (which also operate as feeds). As best shown in FIG. 2B, the antenna elements 202A, 202B, 202C arranged on an imaginary circle (path) with radius $p_r$ and angularly spaced apart generally equally by an angle $\theta_r$.

The dielectric block 204 mounted on the ground plane 206 is made of dielectric material(s) and has a dielectric constant $\varepsilon_r$. The dielectric block 204 is generally cylindrical block with height $h_d$ and radius $r_d$. The dielectric block 204 has a higher height than the antenna elements 202A, 202B, 202C (with reference to the ground plane 206). The dielectric block 204 is arranged generally centrally of the ground plane 206. In plan view, the ground plane 206 is larger than the dielectric block 204. The dielectric block 204 includes three openings, each receiving or surrounding a respective one of the antenna elements 202A, 202B, 202C. The openings have generally the same shape and size. The openings are also arranged on the imaginary circle (path) and angularly spaced apart generally equally by an angle $\theta_r$. The imaginary circle (path) and a further imaginary circle (path) defined by a base of the dielectric block 204 are generally concentric in plan view (FIG. 2B). The dielectric block 204 in this example has a diameter of $0.3\lambda_0$ and the antenna elements 202A, 202B, 202C are separated by $0.14\lambda_0$ (X is wavelength of center operation frequency of the multi-polarization antenna in free space).

The ground plane 206 in this embodiment is provided by a generally circular aluminum disc with radius $r_g$ and thickness t.

The multi-polarization antenna 200 also includes a feed arrangement operably coupled with the antenna elements. In this example, the multi-polarization antenna 200 has three feeds 208A, 208B, 208C, provided by the three SMA connectors that provide the antenna elements 202A, 202B, 202C, each coupled with a respective one of the antenna elements 202A, 202B, 202C, to selectively operate one or more of them or simultaneously operate two or more of them, for receiving and/or transmitting electromagnetic waves.

Values of the parameters of the multi-polarization antenna 200 in this embodiment are: $\varepsilon_r$=10, $h_r$=12.5 mm, $r_r$=0.635 mm, $\theta_r$=120°, $p_r$=7.1 mm, $h_d$=14 mm, $r_d$=12.9 mm, $r_g$=40 mm, and t=2 mm.

Figure 3A:
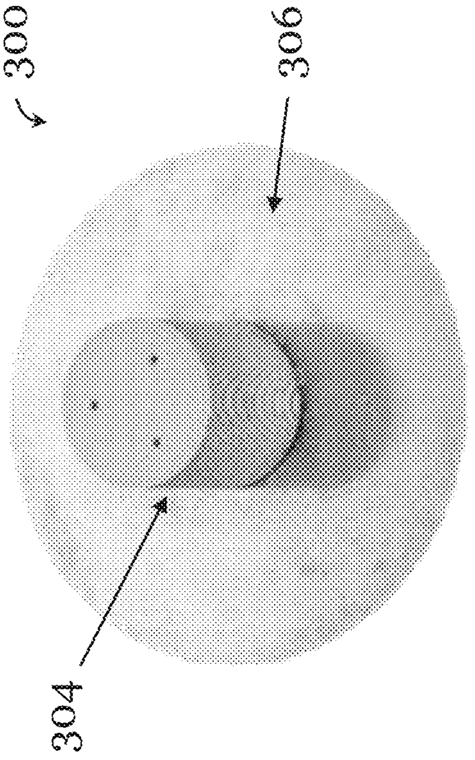
FIG. 3A is a picture (perspective view) of a multi-polarization antenna fabricated in accordance with the multi-polarization antenna of FIG. 2A.
Figure 3B:
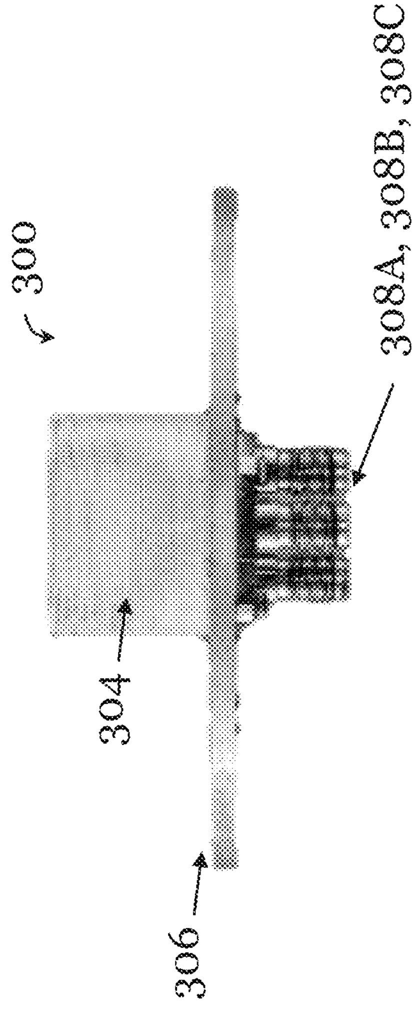
FIG. 3B is a picture (side view) of the multi-polarization antenna of FIG. 3A.

FIGS. 3A and 3B show a multi-polarization antenna 300 fabricated in accordance with the multi-polarization antenna 200 of FIGS. 2A to 2C, using the same values of the parameters. In FIGS. 3A and 3B, the antenna elements of the multi-polarization antenna 300 are hidden from view by the dielectric block 304 on the ground plane 306, and the feeds 308A, 308B, 308C are visible.

Figure 4:
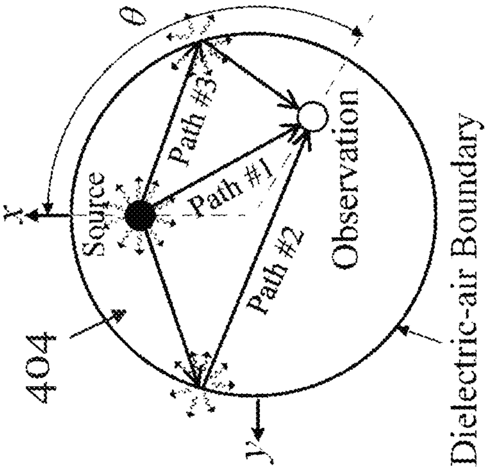
FIG. 4 is a schematic diagram illustrating a (intra-antenna) decoupling mechanism in the multi-polarization antenna of FIG. 2A.

In the above design of FIGS. 2A to 2C, the closely-spaced monopole elements (antenna elements 202A-202C) necessarily have or induce strong mutual couplings. In the above design of FIGS. 2A to 2C, by loading the dielectric block 204, these mutual couplings can be significantly reduced. FIG. 4 illustrates the decoupling mechanism, i.e., the operation by a dielectric block 404 (e.g., the dielectric block 204). In FIG. 4, only a 2D drawing (top view) is shown for simplicity. As shown in FIG. 4, a source point and an observation point are chosen in a dielectric block 404, and they are equally spaced, angularly, on an imaginary circle. The loaded dielectric block 404 provides dielectric-air boundaries for electromagnetic waves inside and outside. Hence, when the source point is excited to radiate electromagnetic waves, the response field at the observation point is a combination of the directly transmitted electromagnetic waves (Path #1) and the reflected electromagnetic waves (Path #2, #3, etc.). By adjusting or optimizing the position(s) of the source point(s) and/or the shape of the loaded dielectric block 404, the directly transmitted and reflected electromagnetic waves can be made 180° out of phase and with comparable magnitudes. Thus, the directly transmitted and reflected electromagnetic waves superpose destructively at the observation point to provide a low coupling level between the source and observation points.

Figure 5:
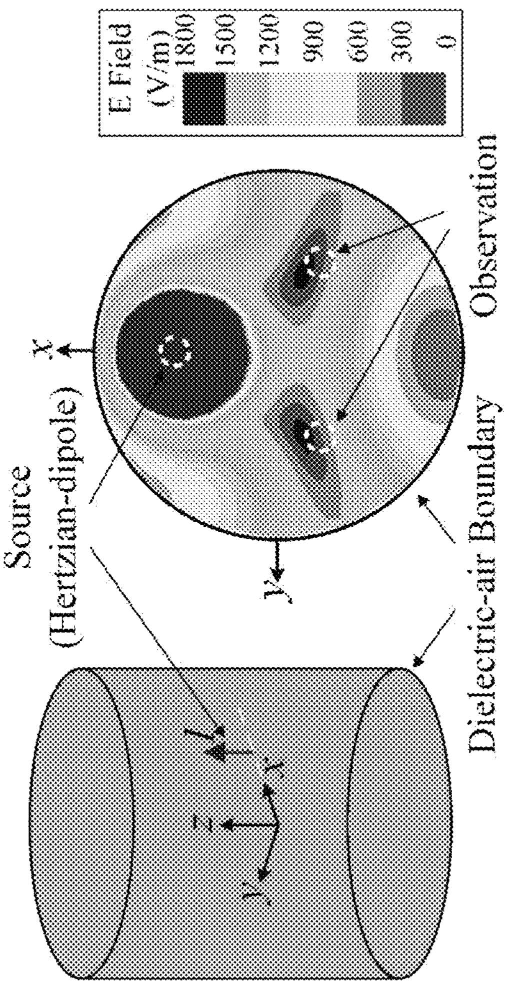
FIG. 5 is a schematic diagram illustrating a simulation model and results related to the decoupling mechanism of FIG. 4.

FIG. 5 shows a simulation model and results that verify the concept of the decoupling mechanism of FIG. 4. In FIG. 5, a Hertzian dipole source wrapped in a cylindrical dielectric block is simulated. In the simulation all parameter values are the same as those used in the multi-polarization antenna 200 in FIG. 2A, except that the ground plane is removed and the height of the loaded dielectric block is doubled (to account for the removed ground plane). The E-field distribution shown in FIG. 5 show two field valleys (observation points) when the Hertzian dipole is excited at the source point. Thus, high isolations can be expected between the source and observation points.

The resonance mode utilized to realize the coplanar tri-polarization design in the multi-polarization antenna 200 in FIG. 2A is briefly discussed. By loading the dielectric block 204, the half-wavelength monopole mode of the monopole antenna elements 202A-202C can be excited, and a quasi-boresight radiation pattern can be obtained.

Figure 6:
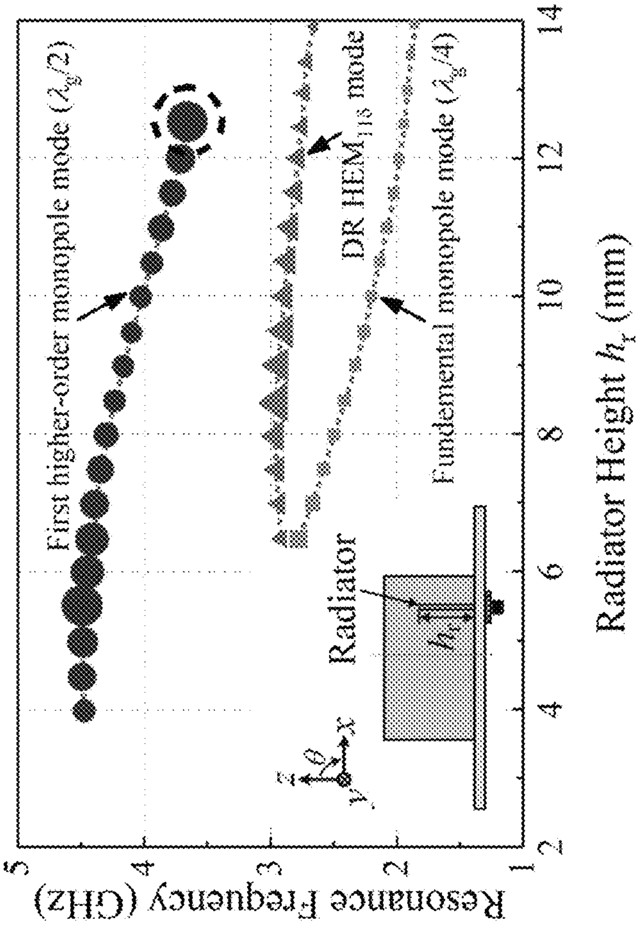
FIG. 6 is a graph showing resonance frequencies of three resonance modes with different antenna element height $h_r$ in the multi-polarization antenna of FIG. 2A.

To confirm that the resonance mode is not a dielectric resonator (DR) mode, the resonance frequencies of fundamental monopole mode ($\lambda_g/4$), DR $HEM_{11\delta}$ mode, and first higher-order monopole mode ($\lambda_g/2$) are studied for different antenna element heights $h_r$ in the multi-polarization antenna 200 in FIG. 2A ($\lambda_g$ is wavelength of center operation frequency in the dielectric material of the dielectric block). FIG. 6 shows these three resonance mode frequencies as a function of the antenna element heights $h_r$. In the model used in FIG. 6, the parameter values are the same as the parameter values used in the multi-polarization antenna 200 in FIG. 2A (except $h_r$, which is varied). In FIG. 6, different marks represent different resonance modes, and the larger the mark the better the matching).

As shown in FIG. 6, the resonance frequencies of DR $HEM_{11\delta}$ mode for all antenna element heights $h_r$ are not far away from the theoretical resonance frequency (2.97 GHz). However, the resonance frequencies of the fundamental monopole mode ($\lambda_g/4$) and the first higher-order monopole mode ($\lambda_g/2$) clearly decrease as $h_r$ increases. Also, the resonance frequencies of the first higher-order monopole mode ($\lambda_g/2$) are almost always twice the resonance frequencies of the fundamental monopole mode ($\lambda_g/4$). From the results in FIG. 6, it can be determined that the operating mode of the multi-polarization antenna 200 (marked by a black dashed circle, $h_p$=12.5 mm) is mainly caused by the half-wavelength monopole (first higher-order monopole mode ($\lambda_g/2$)).

Figure 7:
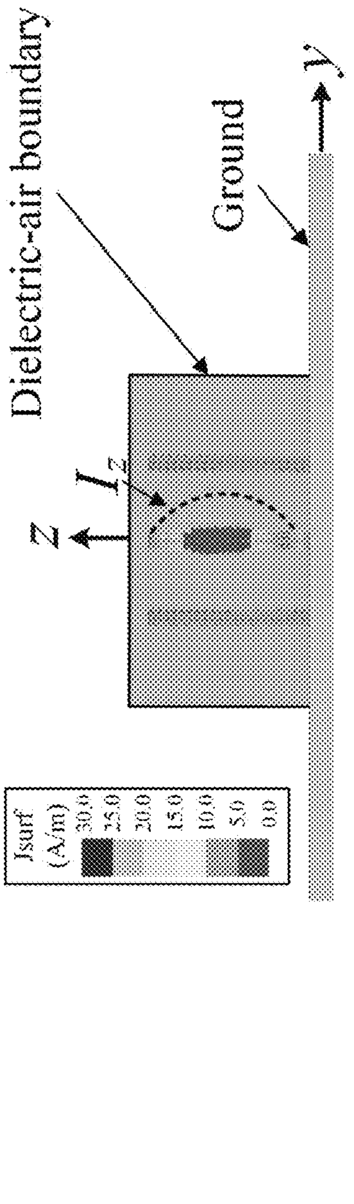
FIG. 7 is a plot showing surface electric currents on one of the antenna elements in operation (excited) at 3.5 GHz (as center frequency)

The resonance mode can also be verified by the current distribution on the antenna element. FIG. 7 shows surface electric currents on one of the antenna elements in operation (excited) at 3.5 GHz (as center frequency). As shown in FIG. 7, a half sine-shaped current distribution (blue dashed line) can be found on the antenna element. This indicates that the antenna element operates in the first higher-order monopole mode ($\lambda_g/2$)).

Figure 8:
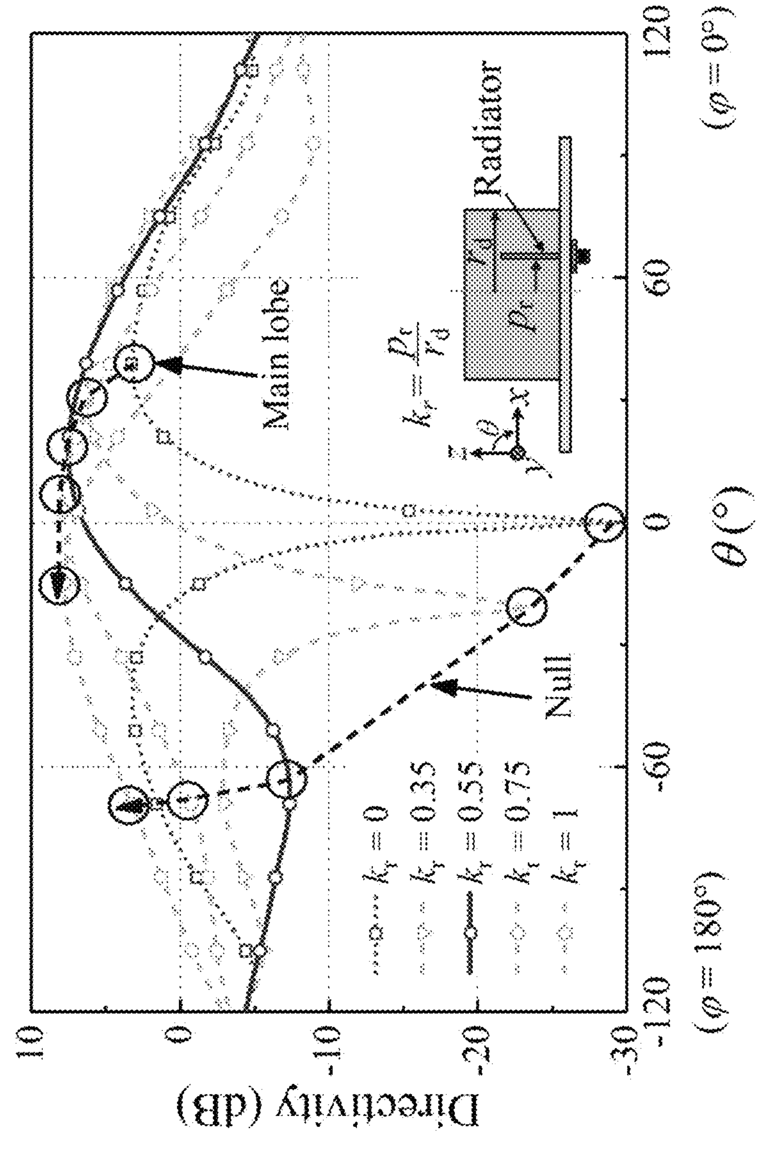
FIG. 8 is a graph showing the directivities of the one of the antenna elements in operation (excited) at 3.5 GHz (as center frequency) with different antenna element positions $k_r$.

The radiation patterns of the dielectric-loaded antenna elements 202A-202C in the multi-polarization antenna 200 are also studied. FIG. 8 shows the effects of displacement of one of the antenna elements 202A-202C (with respect to the center of the dielectric block 204) on the main lobes and radiation nulls. In the model in FIG. 8, the parameter values are the same as the parameter values used in the multi-polarization antenna 200 in FIG. 2A (except $k_r$, defined by $p_r/r_d$, which is varied). As shown in FIG. 8, a typical monopole-like radiation pattern can be observed when the antenna element is at the center of the dielectric block 204 ($k_r$=0), and as the antenna element moves away from the center of the dielectric block 204, the antenna response becomes asymmetric, with the main lobe gradually moves towards the boresight direction and the radiation null moves towards the side direction (as shown by the dashed lines). In this example, when $k_r$ is 0.55, the tilt angle of the main lobe is 18°.

Figure 9:
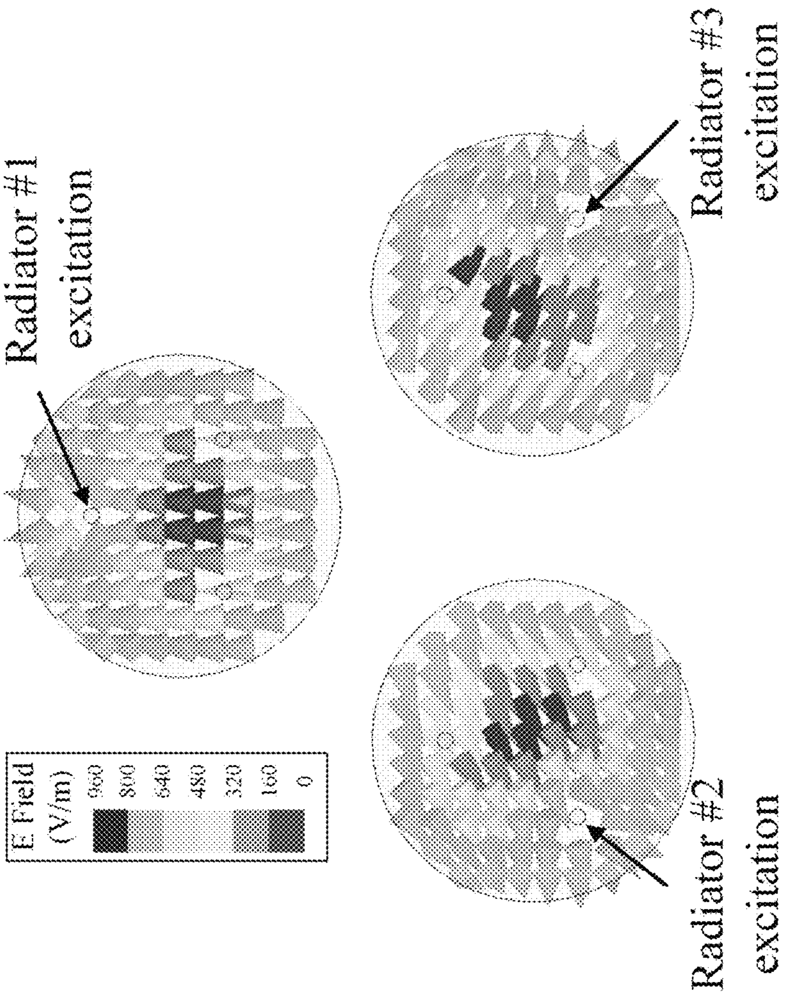
FIG. 9 is a plot showing electric field distribution inside the dielectric block when the antenna elements are separately excited at 3.5 GHz.

FIG. 9 shows E-field distribution inside the dielectric block 204 when the antenna elements 202A-202C of the multi-polarization antenna 200 in FIG. 2A are separately excited at 3.5 GHz. As shown in FIG. 9, the E-field direction rotates by an angle of about 120° when the antenna elements are switched from one to another. The dielectric block 204 helps to reshape the field distributions near the antenna elements 202A-202C, and thus the far-field patterns of the multi-polarization antenna 200 are altered to be directional.

Further tests are performed using the multi-polarization antenna 200 and the corresponding multi-polarization antenna 300 prototype. Specifically, scattering parameters of the antenna are measured using an Agilent N5230A PNA-L Network Analyzer whereas the radiation patterns, realized gains, and efficiencies of the antenna are measured using a Satimo StarLab system.

Figure 10:
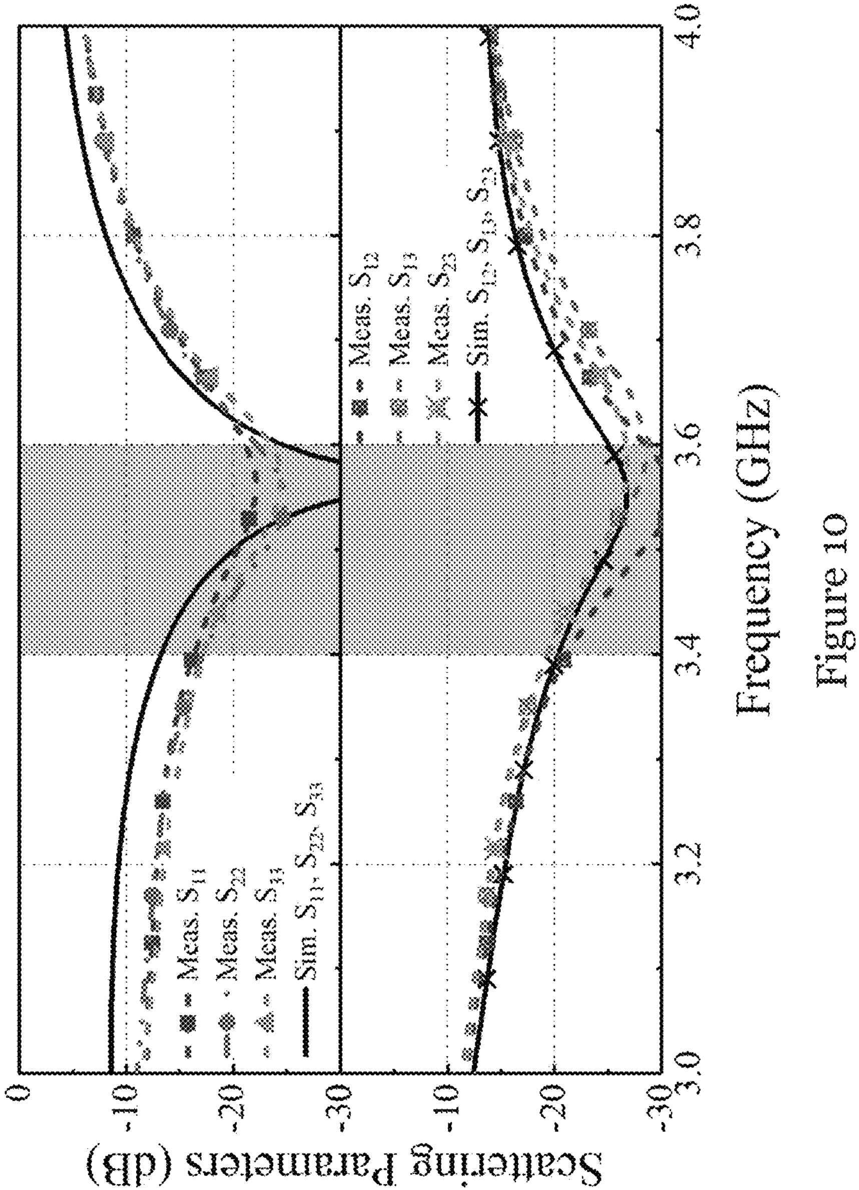
FIG. 10 is a graph showing measured and simulated scattering parameters of the multi-polarization antenna of FIG. 2A/3A at different frequencies.

FIG. 10 shows measured and simulated scattering parameters of the multi-polarization antenna of FIG. 2A/3A at different frequencies. The parameter values used are the same as the parameter values used for the multi-polarization antenna 200 of FIG. 2A. As shown in FIG. 10, the measured results generally agree with the simulated results. Good consistency can also be found among the different measured antenna elements. The measured 10 dB impedance bandwidths can cover the entire 3.5 GHz band (3.4 GHz to 3.6 GHz) for 5G communications. The measured mutual coupling between any two antenna elements is desirably weak, being less than −19.50 dB across the operating band.

Figure 11A:
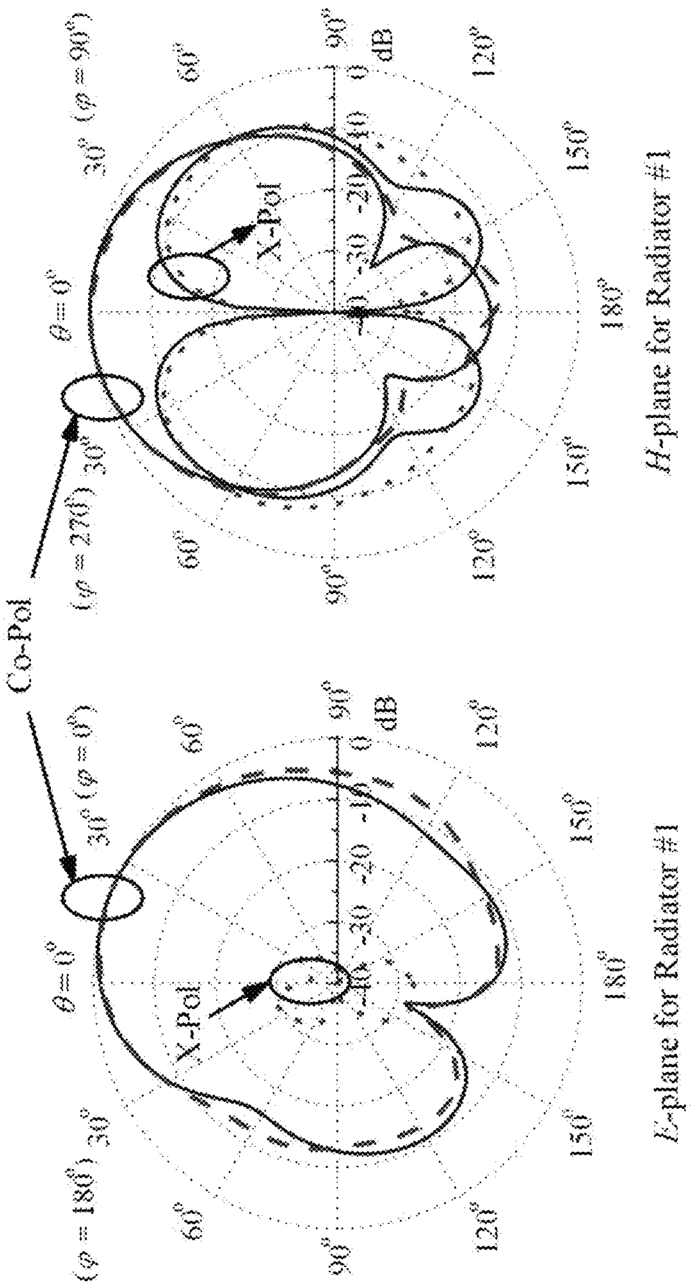
FIG. 11A is a plot showing measured and simulated E-plane and H-plane radiation patterns of the multi-polarization antenna of FIG. 2A/3A at 3.5 GHz when the first antenna element of the multi-polarization antenna of FIG. 2A/3A is operated (excited)
Figure 11B:
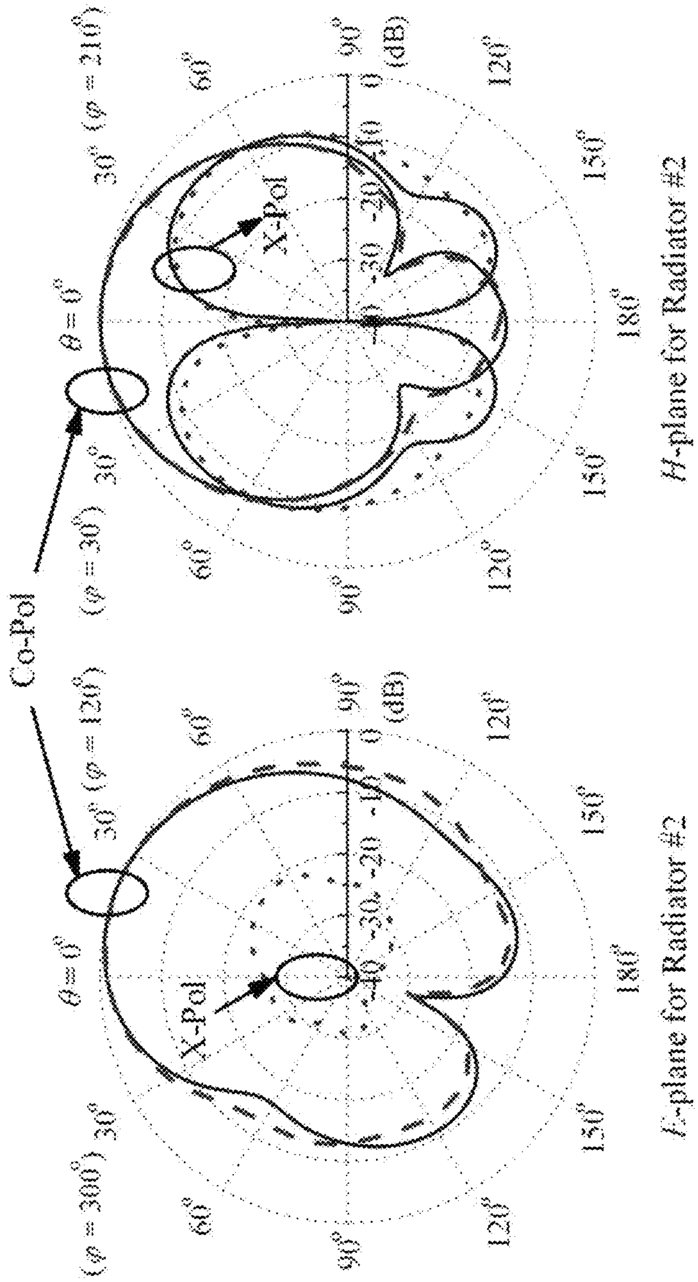
FIG. 11B is a plot showing measured and simulated E-plane and H-plane radiation patterns of the multi-polarization antenna of FIG. 2A/3A at 3.5 GHz when the second antenna element of the multi-polarization antenna of FIG. 2A/3A is operated (excited)
Figure 11C:
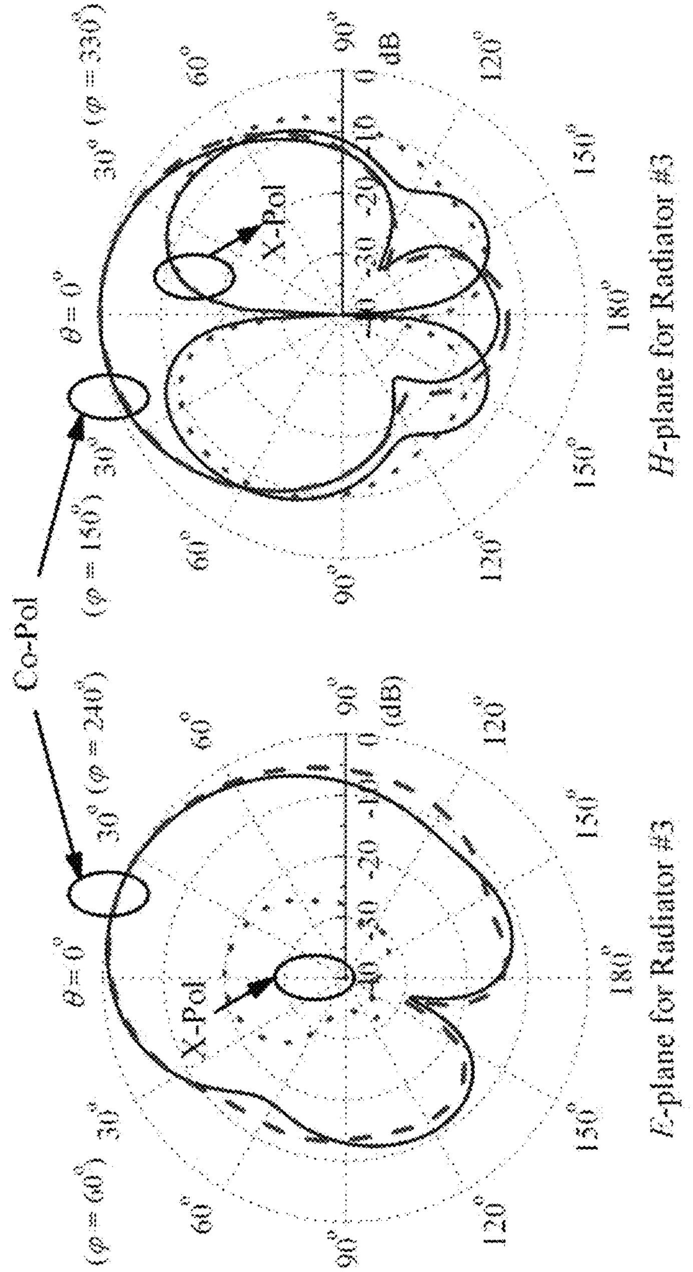
FIG. 11C is a plot showing measured and simulated E-plane and H-plane radiation patterns of the multi-polarization antenna of FIG. 2A/3A at 3.5 GHz when the third antenna element of the multi-polarization antenna of FIG. 2A/3A is operated (excited)

FIGS. 11A to 11C show the measured and simulated E-plane and H-plane radiation patterns of the multi-polarization antenna of FIG. 2A/3A at 3.5 GHz, when antenna elements of the multi-polarization antenna of FIG. 2A/3A is operated (excited). The parameter values used are the same as the parameter values used for the multi-polarization antenna 200 of FIG. 2A. As shown in FIGS. 11A to 11C, the measured results reasonably agree with the simulated results. In FIGS. 11A to 11C, the radiation patterns are presented in E-planes (φ=0° for antenna element #1, φ=120° for antenna element #2, φ=240° for antenna element #3) and H-planes (φ=90° for antenna element #1, φ=210° for antenna element #2, φ=330° for antenna element #3). With reference to FIGS. 11A to 11C, a general unidirectional boresight radiation pattern can be observed. Due to the asymmetric arrangement of the antenna elements, the measured E-plane main lobe deviates from the boresight direction (θ=0°) by about 20°, which reasonably agrees with the simulated results. On the other hand, the H-plane pattern is generally symmetric, as expected. For all of the antenna elements, the measured cross-polarization levels in the boresight direction are below −20 dB.

Figure 12:
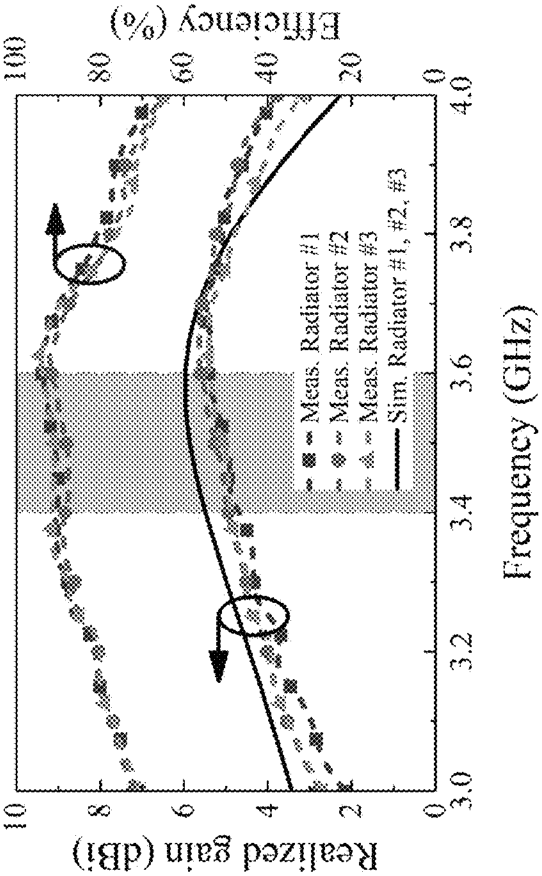
FIG. 12 is a graph showing simulated and measured realized gain and efficiencies of the multi-polarization antenna of FIG. 2A/3A at different frequencies.

FIG. 12 shows simulated and measured realized gain and efficiencies of the multi-polarization antenna of FIG. 2A/3A at different frequencies. The parameter values used are the same as the parameter values used for the multi-polarization antenna 200 of FIG. 2A. As shown in FIG. 12, the measured realized gains agree reasonably with the simulated results. Moreover, the measurement results of each antenna elements also generally agree with each other. The measured gains vary from 5.0 to 5.6 dBi across the passband whereas the measured efficiencies are more than 87.5%.

With the measured 3D radiation patterns, the envelope correlation coefficient (ECC) values are calculated between every two antenna elements. It has been found that all ECC values are less than 0.05 across the operating band. This shows that the antenna can provide three nearly uncorrelated radiation patterns, suitable for MIMO applications.

Figure 13:
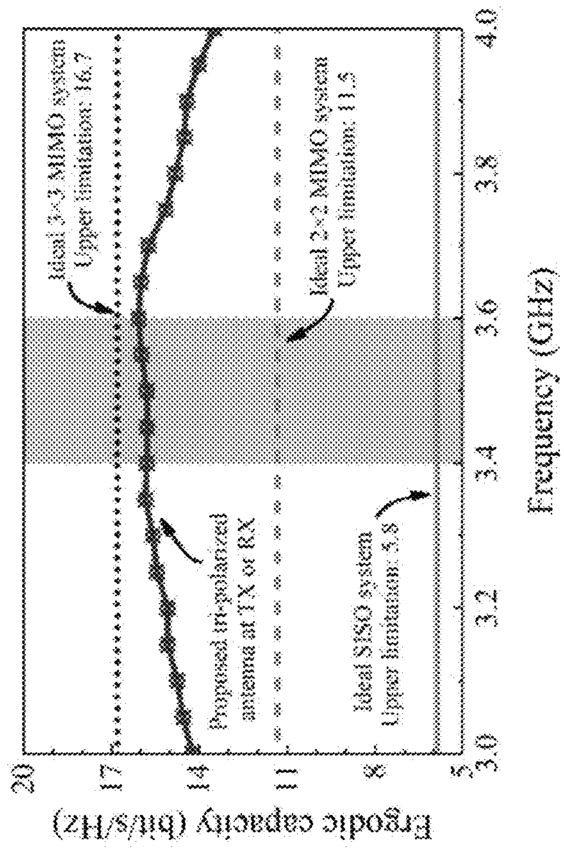
FIG. 13 is a graph showing calculated ergodic channel capacity of the multi-polarization antenna of FIG. 2A/3A, an ideal single-input single-output (SISO) system, an ideal 2×2 multi-input-multi-output (MIMO) system, and an ideal 3×3 MIMO system, with an SNR of 20 dB, at different frequencies.

FIG. 13 shows the calculated ergodic channel capacity of the multi-polarization antenna of FIG. 2A/3A in an isotropic scattering environment. In the calculation, a signal-to-noise ratio (SNR) of 20 dB at the transmitter and Rayleigh fading environment (rich multipath condition) is assumed. The Rayleigh fading channel matrix is generated using MATLAB®. The multi-polarization antenna of FIG. 2A/3A is used on the receiving side of a 3×3 MIMO system whereas an ideal tri-polarization antenna (lossless and ECC=0) is assumed on the transmitting side. For comparison, the theoretical capacities of the ideal 3×3 and 2×2 MIMO systems and the ideal SISO system are also shown in FIG. 13. The results show that the design of FIG. 2A/3A can provide a channel capacity of more than 16.4 bit/s/Hz across the 3.5 GHz band, with the maximum value given by 16.6 bit/s/Hz. It means that the theoretical capacity of the antenna of FIG. 2A/3A is at least 98% and 282% of those of the ideal 3×3 MIMO and SISO antenna systems, respectively.

To further illustrate the invention, an example multi-polarization antenna array made based on multiple ones of the multi-polarization antennas of FIG. 2A is designed.

FIGS. 14A to 14D show a multi-polarization antenna array 1400 in one embodiment of the invention. The multi-polarization antenna array 1400 is an example implementation of the multi-polarization antenna 2600 of FIG. 26 (in an array). The multi-polarization antenna array 1400 in this embodiment is a coplanar tri-polarization hexagonal antenna array suitable for use in long-distance communications.

As shown in FIGS. 14A to 14D, the multi-polarization antenna array 1400 in this embodiment includes seven multi-polarization antennas 200A-200G arranged in a hexagonal configuration array, with one of the antennas 200A in the center and six other antennas 200B-200G arranged around the antenna in the center. The antennas 200A-200G in this embodiment have generally the same configuration and construction as the multi-polarization antenna 200 of FIG. 2A (for simplicity, details will not be repeated here). Briefly, each of the multi-polarization antennas 200A-200G in the multi-polarization antenna array 1400 also includes three antenna elements and a dielectric arrangement, in the form of a generally cylindrical dielectric block, operably coupled with the three antenna elements. For each respective one of the multi-polarization antennas 200A-200G in this embodiment, the three polarizations are generally co-planar. The ground planes of the antennas 200A-200G are provided by a single, large ground plane 1406 such that the dielectric arrangements (e.g., dielectric blocks) of each of the multi-polarization antennas 200A-200G are arranged on and spaced apart on the ground plane 1406. In this example, the feed mechanism and the antenna elements of the multi-polarization antennas 200A-200G are also provided by SMA connectors.

Figure 14A:
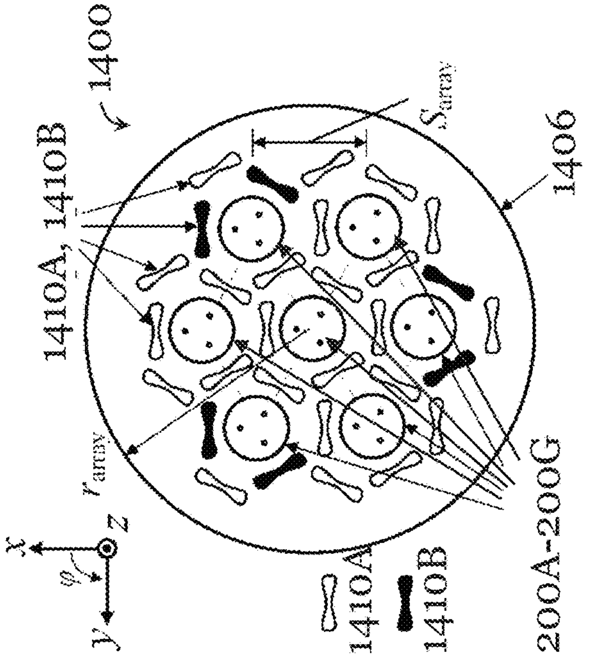
FIG. 14A is a schematic diagram (top view) of a multi-polarization antenna array in one embodiment of the invention.
Figure 14B:
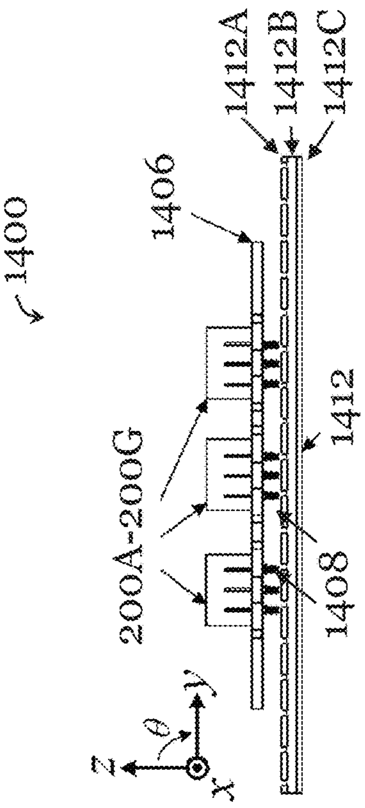
FIG. 14B is a schematic diagram (side view) of the multi-polarization antenna array of FIG. 14A.
Figure 14C:
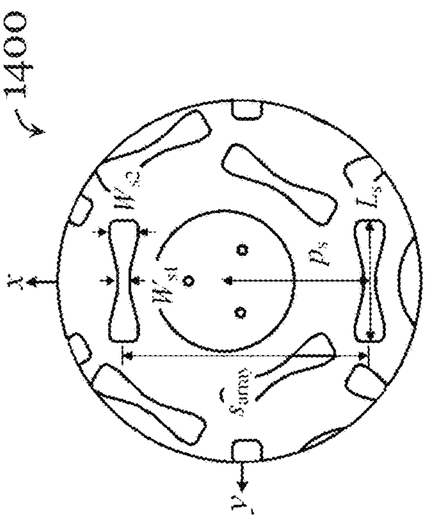
FIG. 14C is a schematic diagram (top view) of part of the multi-polarization antenna array of FIG. 14A.

As shown in FIGS. 14A to 14C, the multi-polarization antenna array 1400 further includes a further dielectric arrangement operably coupled with the multi-polarization antennas 200A-200G to reduce, limit, and/or eliminate mutual coupling between any two or more of them during operation. The further dielectric arrangement can be implemented as a defected ground structure. In this embodiment, the further dielectric arrangement includes multiple dielectric elements 1410A, 1410B arranged in the ground plane 1406. These dielectric elements 1410A, 1410B are provided by dielectric-material-filled slots arranged in the ground plane 1406. In this embodiment the dielectric-material-filled slots have a generally bow-tie shape, with an elongated body having a narrowed center portion and two widened end portions at two ends of the narrowed center portion. There exist two types of such dielectric elements, one type being longer another type being shorter. The shorter type of dielectric elements 1410A (illustrated as white "bow-tie" shape) are disposed between adjacent ones of the multi-polarization antennas 200A-200G. The longer type of dielectric elements 1410B (illustrated as black "bow-tie" shape) are disposed on the radially outer side of three (every other) of the outer multi-polarization antennas 200A-200G, generally not between two multi-polarization antennas 200A-200G. The different lengths dielectric elements 1410A, 1410B are used in this embodiment to take into account edge effect. As best shown in the zoom-in view of the dielectric elements, each of the dielectric elements 1410A, 1410B has a central width of $W_{s1}$ and an end width of $W_{s2}$, and is offset from the center of the dielectric block of a corresponding multi-polarization antenna 200A-200G by $p_s$. The lengths of the two types of dielectric elements 1410A, 1410B are $L_{s1}$ and $L_{s2}$, respectively.

Figure 14D:
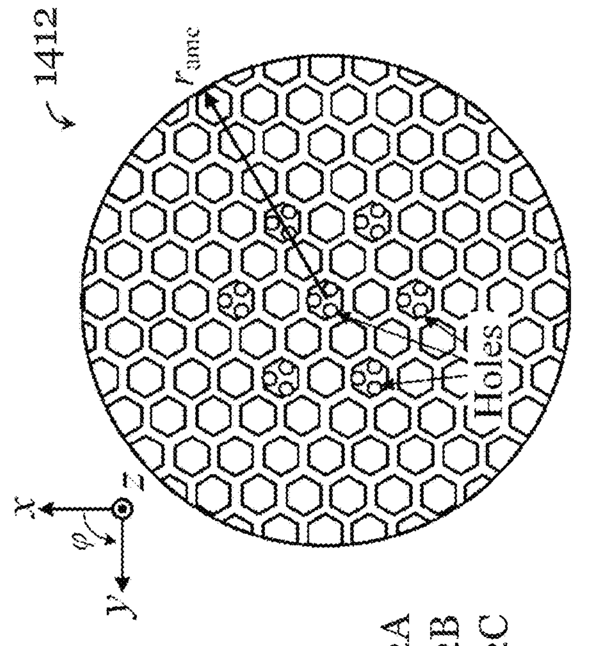
FIG. 14D is a schematic diagram (top view) of a backing artificial magnetic structure of the multi-polarization antenna array of FIG. 14A.

As shown in FIGS. 14A, 14B, and 14D, the multi-polarization antenna array 1400 also includes an artificial magnetic conductor structure 1412, as a backing structure, arranged on a side of the ground plane 1406 opposite the dielectric arrangements (dielectric blocks) of the multi-polarization antennas 200A-200G. In this embodiment, the artificial magnetic conductor structure 1412 is spaced apart from and generally parallel to the ground plane 1406. The artificial magnetic conductor structure 1412 in this embodiment includes a substrate 1412B, an electrically conductive ground 1412C arranged on a lower side of the substrate 1412B, and a layer of electrically conductive patches 1412A arranged an upper side of the substrate 1412B (the side closer to the ground plane 1406). As best shown in FIGS. 14D, the electrically conductive patches in this embodiment are generally hexagonal patches. The generally hexagonal patches (and the underlying substrate and electrically conductive ground portions) provide various generally hexagonal unit cells.

The multi-polarization antenna array 1400 in this embodiment also includes a feed arrangement 1408 operably coupled with the antenna elements of the multi-polarization antennas 200A-200G. In one implementation, the feed arrangement includes one feed operably coupled with all first antenna elements of the multi-polarization antennas 200A-200G, one other feed operably coupled with all second antenna elements of the multi-polarization antennas 200A-200G, and one other feed operably coupled with all third antenna elements of the multi-polarization antennas 200A-200G.

In this embodiment, the isolations among the antenna elements within each multi-polarization antennas 200A-200G are optimized to around 20 dB same as the above with respect to the multi-polarization antenna 200 of FIG. 2A.

Values of the parameters of the multi-polarization antenna array 1400 in this embodiment are: $s_{array}$=46.11 mm, $r_{array}$=90 mm, t=2 mm, $\varepsilon_s$=5, $W_{s1}$=2 mm, $W_{s2}$=7 mm, $p_s$=17.5 mm, $L_{s1}$=23.5 mm (length of slot #1), $L_{s2}$=26.5 mm (length of slot #2), $h_r$=12.5 mm, $r_r$=0.635 mm, $\theta_r$=120°, $p_r$=7.1 mm, $h_d$=20 mm, $r_d$=12.5 mm, $r_{amc}$=125 mm, $t_{amc}$=4 mm, and $h_{amc}$=10 mm.

Figure 15A:
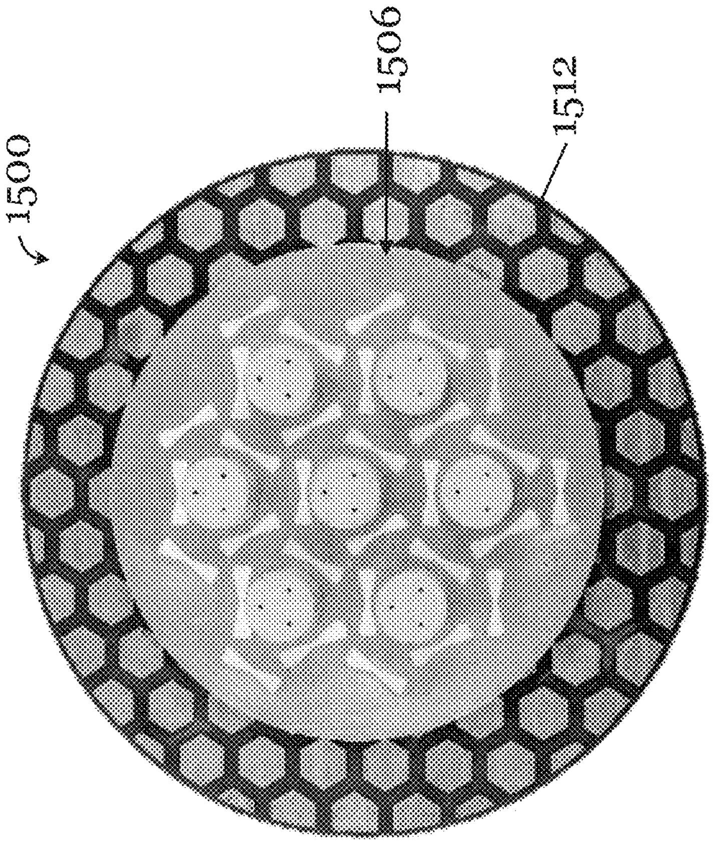
FIG. 15A is a picture (perspective view) of a multi-polarization antenna array fabricated in accordance with the multi-polarization antenna of FIG. 14A.
Figure 15B:
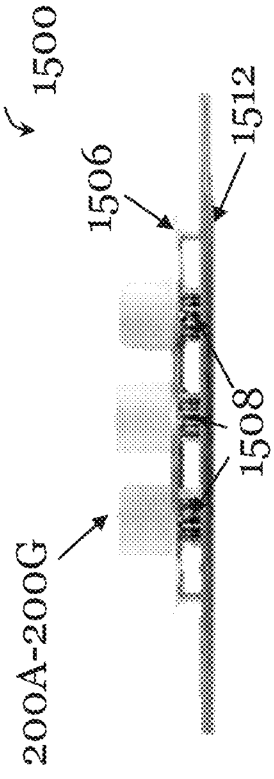
FIG. 15B is a picture (side view) of the multi-polarization antenna array of FIG. 15A.

FIGS. 15A and 15B show a multi-polarization antenna array 1500 fabricated in accordance with the multi-polarization antenna array 1400 of FIGS. 14A to 14D, using the same values of the parameters. In FIGS. 15A and 15B, the antenna elements of the multi-polarization antennas 200A-200G are hidden from view by the respective dielectric blocks on the ground plane 1506 whereas the feed arrangement 1508 (formed by SMA connectors) and the artificial magnetic conductor structure 1512 are visible.

As mentioned, in this embodiment, the isolations among three antenna elements of the same antenna 200A-200G have been optimized to around 20 dB. To reduce the inter-antenna mutual couplings, the antenna array 1400 in this embodiment uses decoupling slots (dielectric elements 1410A, 1410B) that operate as defected ground structure. The decoupling slots (dielectric elements 1410A, 1410B) can effectively improve isolations between the neighboring antennas 200A-200G in the antenna array 1400.

Figure 16:
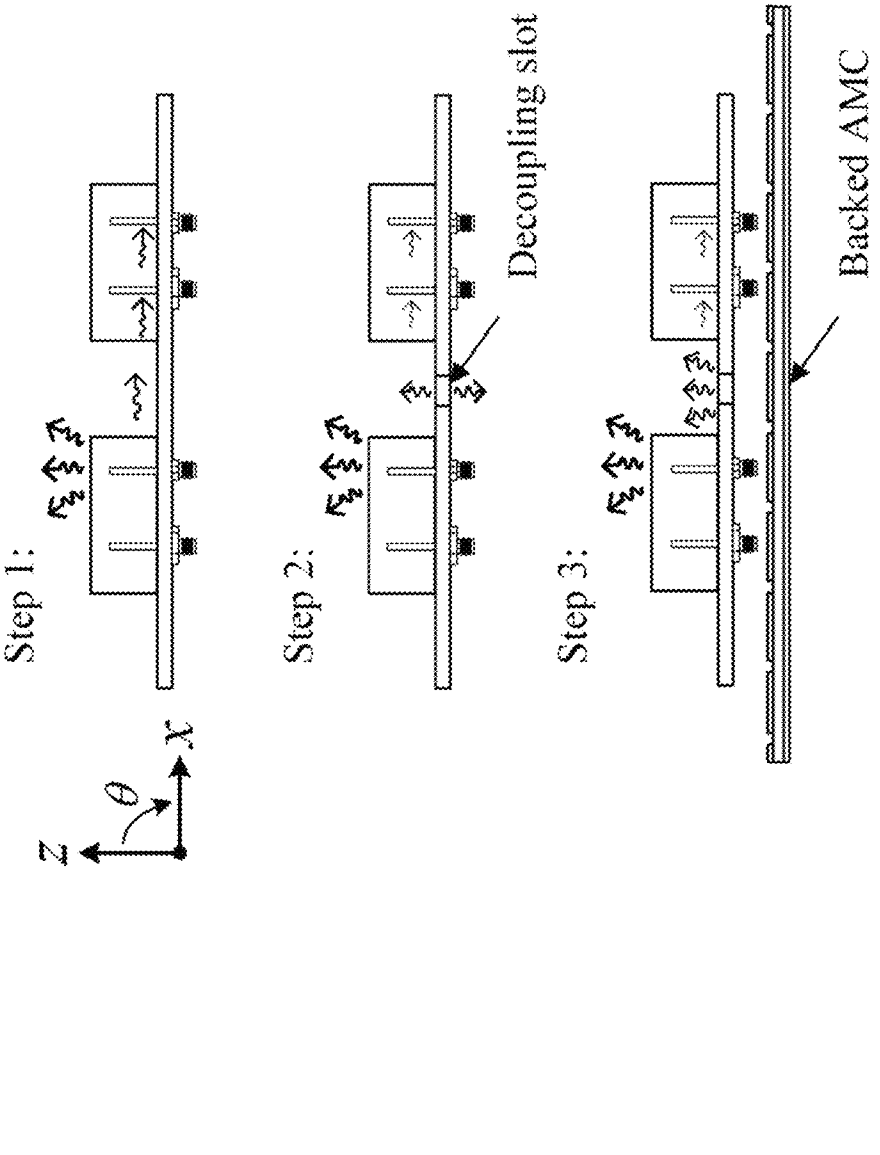
FIG. 16 is a schematic diagram (side view) of a (inter-antenna) decoupling mechanism in the multi-polarization antenna array of FIG. 14A.

FIG. 16 shows the (inter-antenna) decoupling mechanism provided by the dielectric elements 1410A, 1410B in the multi-polarization antenna array 1400 of FIG. 14A. As shown in Step 2 in FIG. 16, the decoupling slots may radiate towards the backside of the antenna, which may result in a relatively large back lobe for the antenna array 1400. As a result the artificial magnetic conductor structure 1412 is added to the array 1400 to optimize the front-to-back ratio (FBR).

Figure 17:
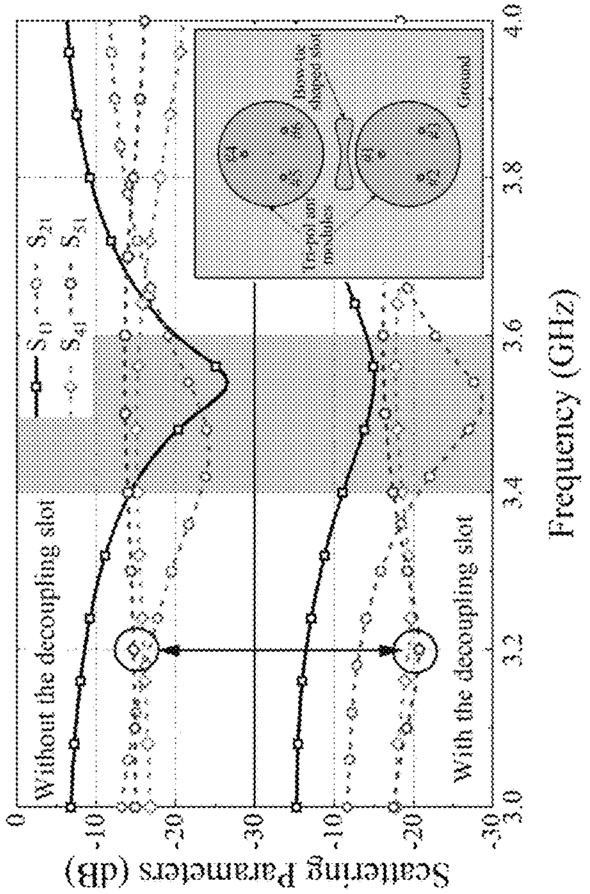
FIG. 17 is a graph showing configuration and scattering parameters of the decoupling mechanism of FIG. 16 between two antennas in the multi-polarization antenna array of FIG. 14A at different frequencies.

Simulation are performed to verify the effectiveness of the dielectric-filled slots of the decoupling mechanism. FIG. 17 shows configuration and scattering parameters of the decoupling mechanism of FIG. 16 between two antennas in the multi-polarization antenna array 1400 of FIG. 14A at different frequencies. The structural parameters and parameter values used in the model in FIG. 17 are the same as those in FIGS. 14A to 14D. By introducing the in-between dielectric-filled slot, additional wave paths are established between the two antennas. When the new paths provide out-of-phase waves to the original paths, inter-module coupling levels can be reduced, limited, or eliminated. FIG. 17 shows the scattering parameters before and after introducing the dielectric-filled slot with antenna element #1 of one of the antenna excited. As shown in FIG. 17, dips appear at around 3.2 GHz on curves of $|S_{41}|$, $|S_{51}|$, and $|S_{61}|$, due to the presence of the decoupling slot. The coupling between adjacent antennas can be reduced from −13.5 dB to −16.3 dB. Meanwhile, the intra-antenna isolations (between antenna elements of the same antenna) are still more than 20 dB.

Figure 18:
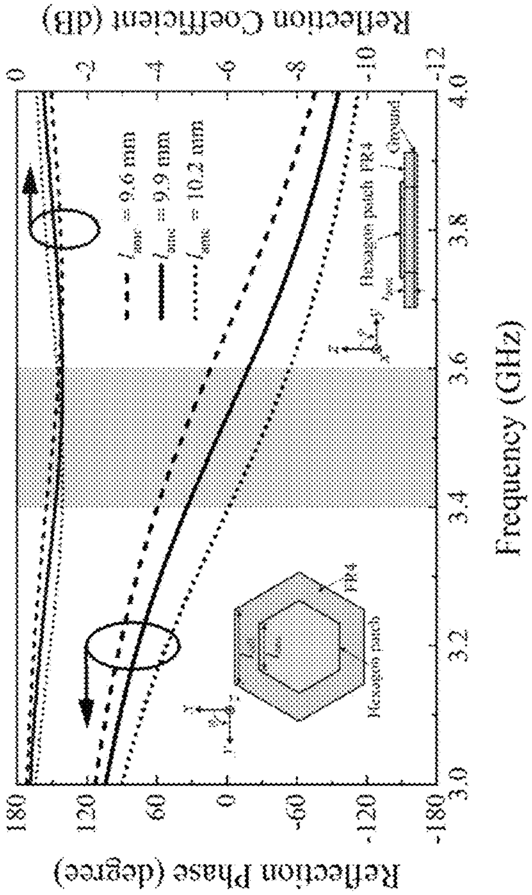
FIG. 18 is a graph showing configuration, phase, and amplitude responses of a hexagon unit cell of the backing artificial magnetic structure of the multi-polarization antenna array of FIG. 14A at different frequencies.

Considering the array shape and the degree of rotational symmetry of the antennas 200A-200G in the antenna array 1400, hexagonal unit cells are chosen to construct the backing artificial magnetic structure. FIG. 18 shows configuration, phase, and amplitude responses of a hexagon unit cell of the backing artificial magnetic structure of the multi-polarization antenna array 1400 of FIG. 14A at different frequencies. In this embodiment, the unit cell includes three layers: a metal ground layer, an FR4 substrate layer, and a metal hexagon patch layer. In FIG. 18, $l_{mac}$ are as illustrated, $l_{cell}$=13.3 mm, $t_{amc}$=4 mm and $l_{amc}$=9.9 mm, other parameter values are the same as those in FIGS. 14A to 14D. FIG. 18 also shows the reflection phases and coefficients for different side lengths $l_{mac}$ of the hexagonal patch. To get a more stable gain across the operating band, the in-phase range of the backing artificial magnetic structure is set from −45° to 45°. As shown in FIG. 18, the frequency of the 0° reflection phase decreases as $l_{mac}$ increases. The in-phase range at $l_{mac}$=9.9 mm can cover the operating 3.5 GHz band with reflection coefficients of more than −1.3 dB.

Figure 19:
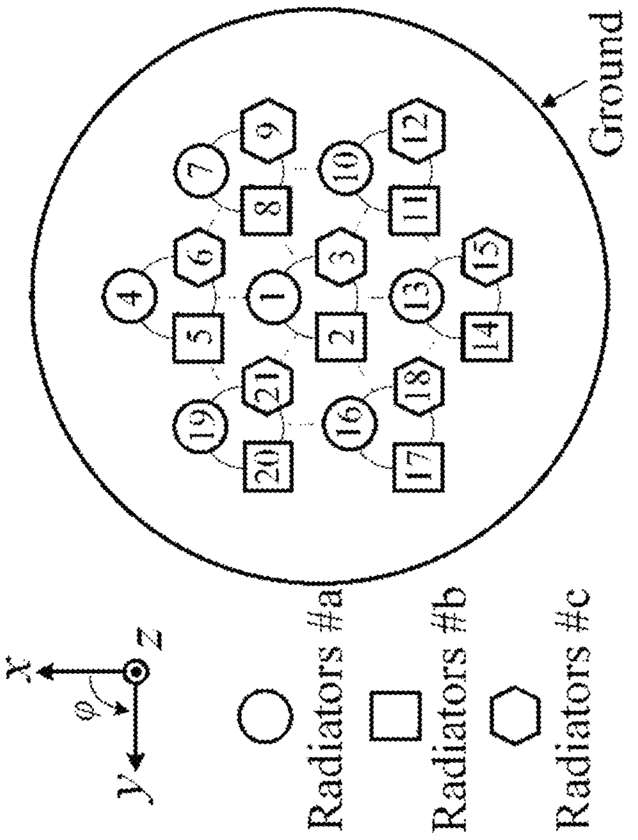
FIG. 19 is a schematic diagram showing grouping and distribution of antenna elements of the antennas in the multi-polarization antenna array of FIG. 14A.

FIG. 19 is a schematic diagram showing grouping and distribution of antenna elements of the antennas 200A-200G in the multi-polarization antenna array 1400 of FIG. 14A. As is shown in FIG. 19, all antenna elements are numbered and divided into three groups (groups #a, #b, and #c), which correspond to three quasi-orthogonal polarizations.

Figure 20:
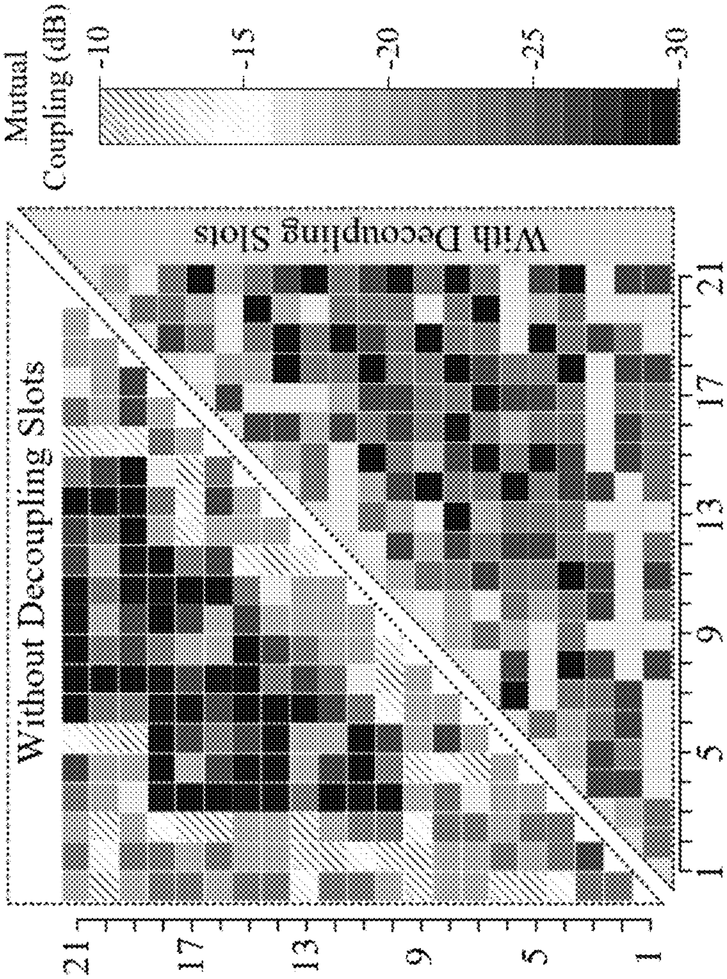
FIG. 20 is a plot showing mutual coupling results among the 21 antenna elements of the antennas in the multi-polarization antenna array of FIG. 14A, as illustrated in FIG. 19, with and without decoupling slots.

FIG. 20 shows mutual coupling results among the 21 antenna elements of the 200A-200G in the multi-polarization antenna array 1400, as illustrated in FIG. 19, with and without decoupling slots. As shown in FIG. 20, some of the mutual couplings are worse than −15 dB before loading the dielectric-filled decoupling slots. However, mutual couplings between any two ports are better than −15 dB after loading the dielectric-filled decoupling slots.

The multi-polarization antenna array 1400 can obtain three senses of polarization in the boresight direction. For each of the polarizations, a moderate antenna gain is obtained by exciting seven antennas 200A-200G simultaneously, which are fed by a seven-way in-phase power divider. In other words, the array has three independent feed ports, denoted by ports #a, #b, and #c, respectively.

Figure 21:
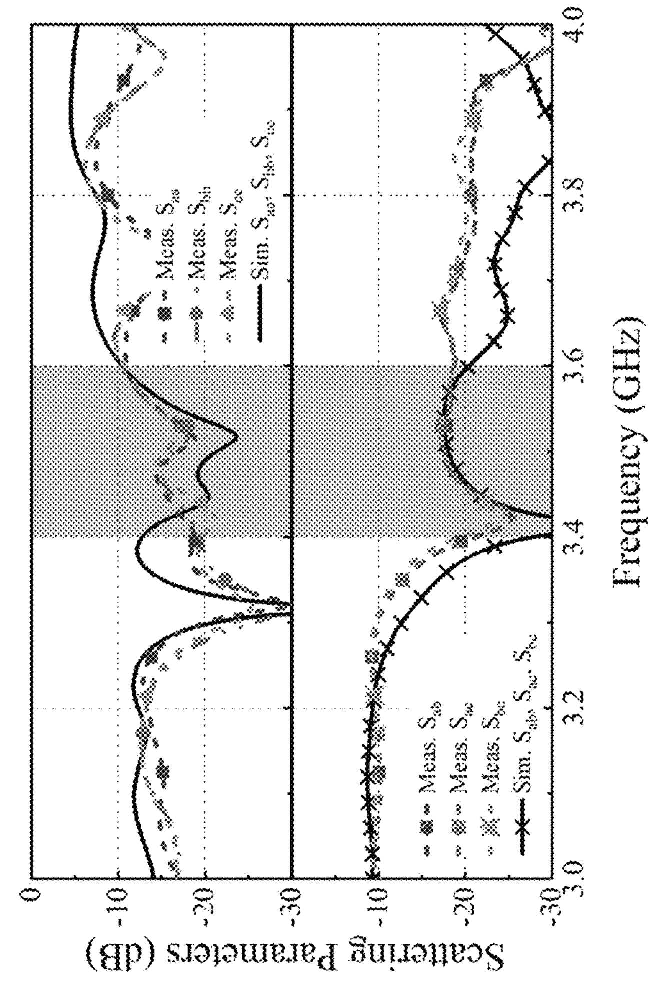
FIG. 21 is a graph showing measured and simulated scattering parameters of the multi-polarization antenna array of FIG. 14A/15A at different frequencies.

FIG. 21 shows measured and simulated scattering parameters of the multi-polarization antenna array of FIG. 14A/15A at different frequencies. The parameter values used in FIG. 21 are the same as those in FIGS. 14A to 14D. As shown in FIG. 21, the measured scattering parameters of the three ports agree reasonably with the simulated results. All the three ports are well matched across the operating band (3.4-3.6 GHz), and each two of them are also well isolated, with measured isolations of more than 17.5 dB.

Figure 22:
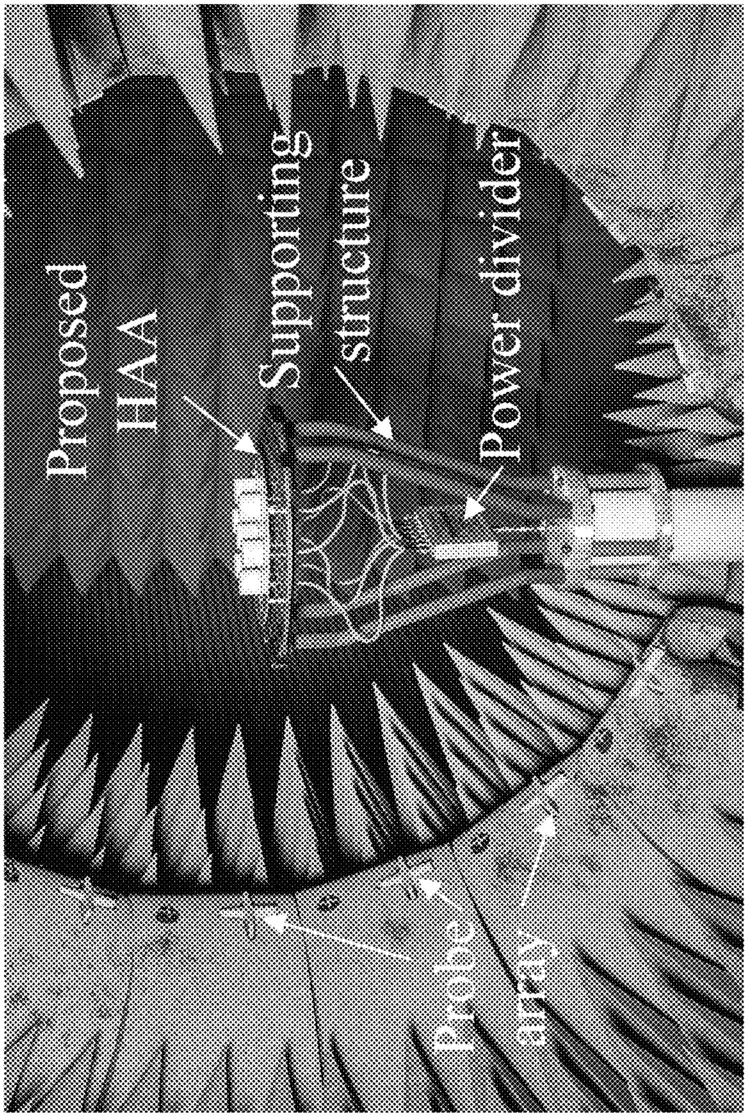
FIG. 22 is a picture showing a set up for measuring the radiation patterns of the multi-polarization antenna array of FIG. 15A in one example.
Figure 23A:
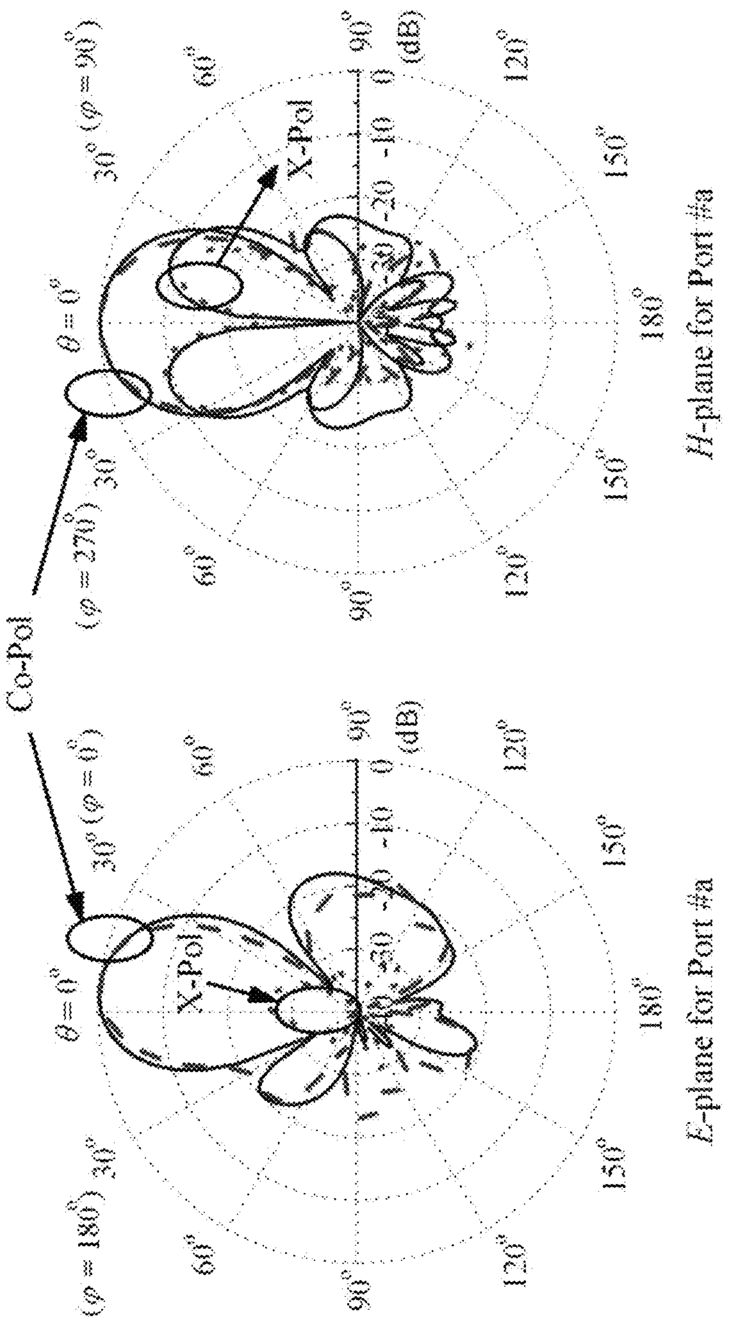
FIG. 23A is a plot showing measured and simulated E-plane and H-plane radiation patterns of the multi-polarization antenna array of FIG. 14A/15A at 3.5 GHz when the first antenna elements of all antennas of the multi-polarization antenna array of FIG. 14A/15A are operated (excited)
Figure 23B:
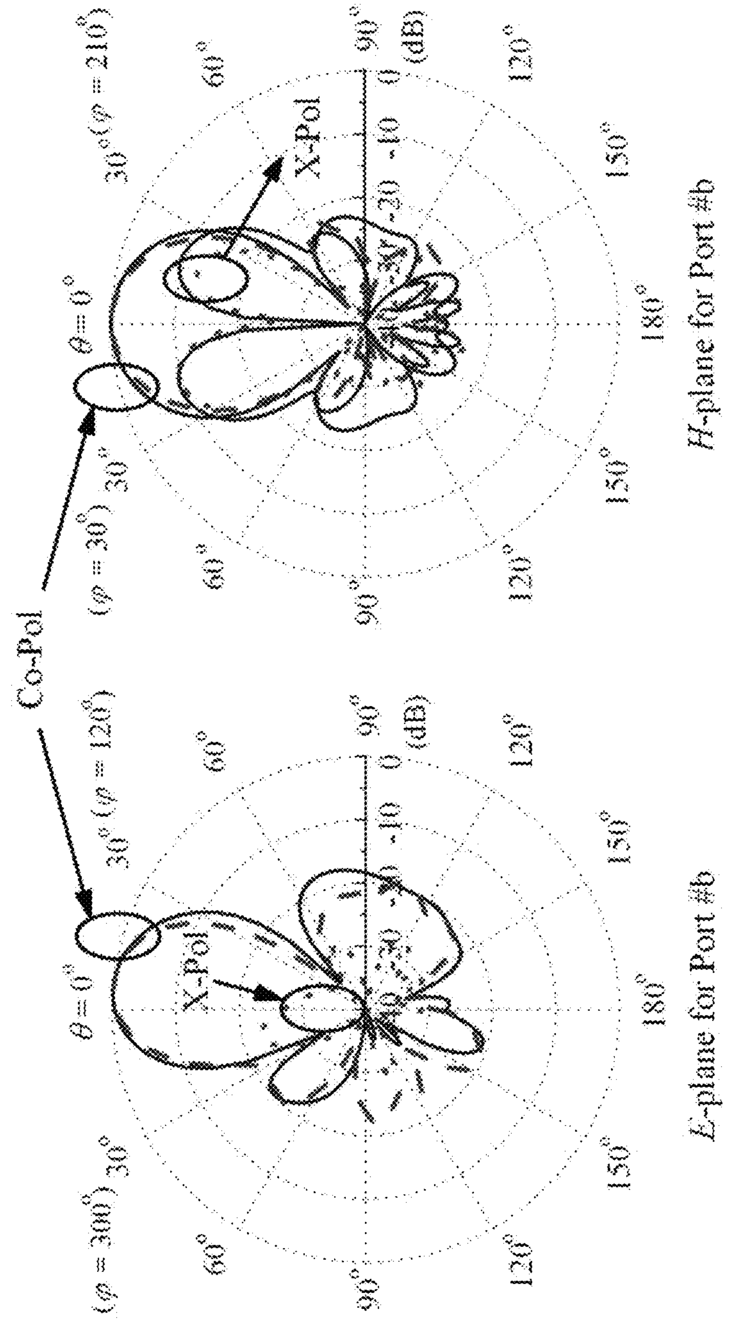
FIG. 23B is a plot showing measured and simulated E-plane and H-plane radiation patterns of the multi-polarization antenna array of FIG. 14A/15A at 3.5 GHz when the second antenna elements of all antennas of the multi-polarization antenna array of FIG. 14A/15A are operated (excited)
Figure 23C:
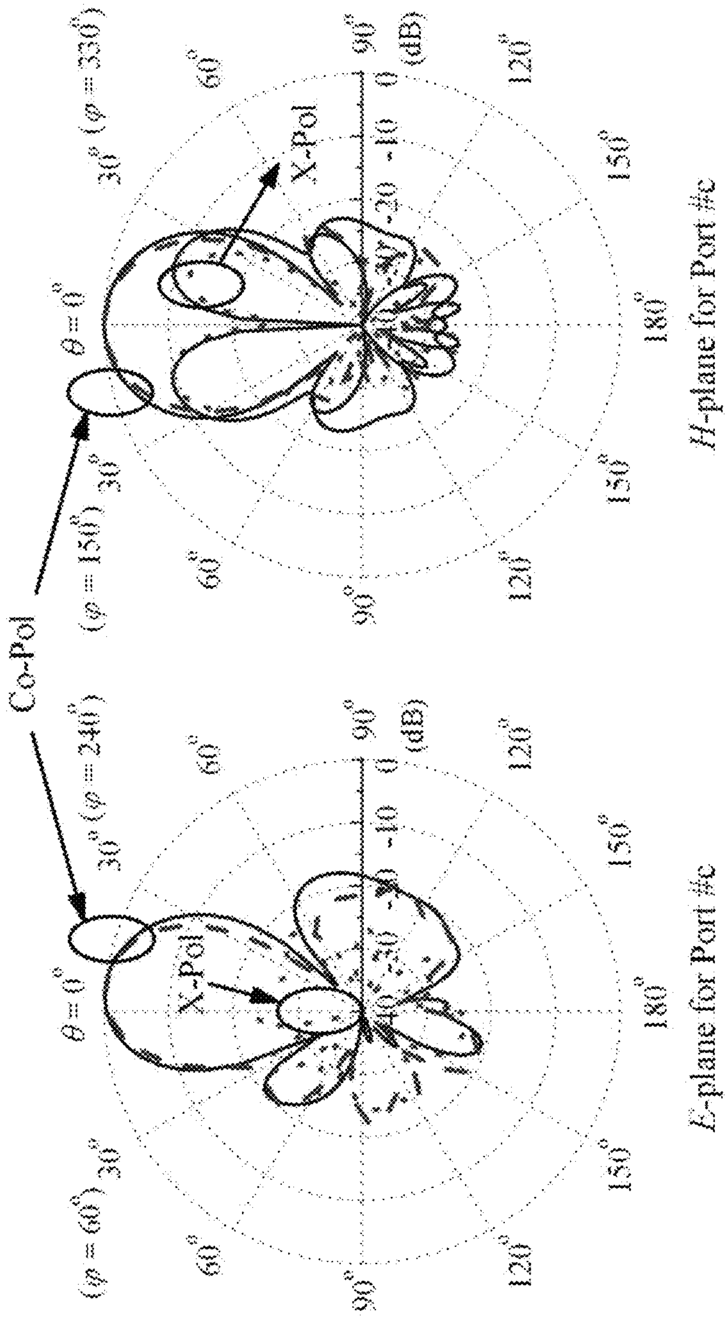
FIG. 23C is a plot showing measured and simulated E-plane and H-plane radiation patterns of the multi-polarization antenna array of FIG. 14A/15A at 3.5 GHz when the third antenna elements of all antennas of the multi-polarization antenna array of FIG. 14A/15A are operated (excited)

FIG. 22 shows a set up for measuring the radiation patterns of the multi-polarization antenna array 1500 of FIG. 15A in one example. The parameter values used are the same as those in FIGS. 14A to 14D. FIG. 23A shows measured and simulated E-plane and H-plane radiation patterns of the multi-polarization antenna array of FIG. 14A/15A at 3.5 GHz when the first antenna elements of all antennas of the multi-polarization antenna array of FIG. 14A/15A are operated (excited). FIGS. 23B and 23C show the corresponding results when the second and third antenna elements of all antennas of the multi-polarization antenna array of FIG. 14A/15A are operated (excited), respectively.

As shown in FIGS. 23A to 23C, the measured radiation patterns reasonably agree with the simulated radiation patterns. In FIGS. 23A to 23C, the radiation patterns are presented in the E-planes (φ=0° for port #a, φ=120° for port #b, φ=240° for port #c) and H-planes (φ=90° for port #a, φ=210° for port #b, φ=330° for port #c). As shown in FIGS. 23A to 23C, quasi unidirectional patterns with narrow beamwidths in both the E- and H-planes are obtained. Note that the measured tilt angle is substantially reduced from 20° for an isolated antenna (see FIGS. 11A-11C) to now 6° in the E-planes. The measured boresight (θ=0°) realized gain is less than the peak gain (θ=6°) by 0.5 dB only. Good linearly polarized and generally symmetrical radiation patterns can be obtained in the H-planes.

Figure 24:
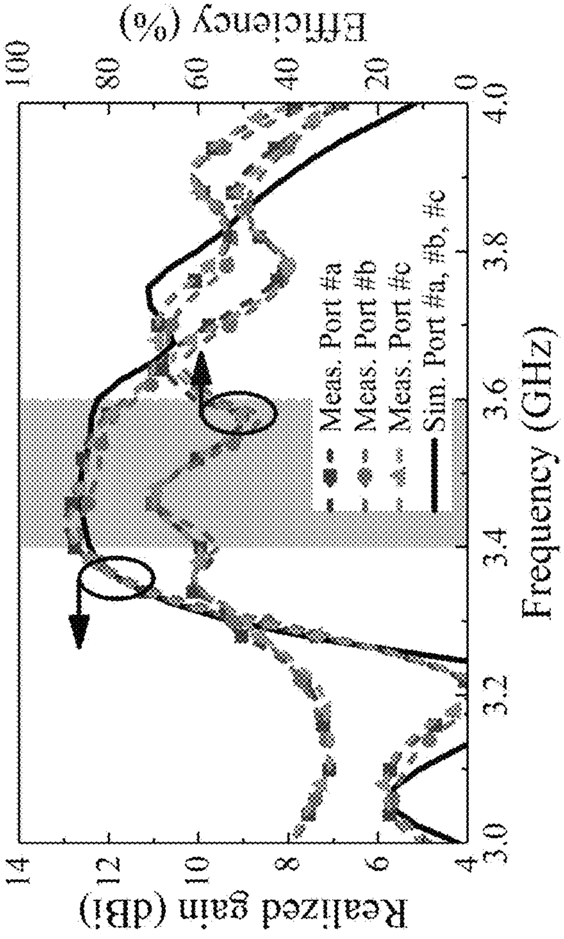
FIG. 24 is a graph showing measured and simulated realized gains and efficiencies of the multi-polarization antenna array of FIG. 14A/15A at different frequencies.

FIG. 24 shows measured and simulated boresight realized gains (θ=0°) and efficiencies of the multi-polarization antenna array of FIG. 14A/15A at different frequencies. The parameter values used are the same as those in FIGS. 14A to 14D. As shown in FIG. 24, the measured realized gains generally agree with the simulated realized gains. The measured realized gain varies from 12.05 dBi to 12.95 dBi across the 3.5 GHz band. FIG. 24 also shows the measured total antenna efficiencies for each port, which are more than 50.5% and have maximum values of around 70% at 3.46 GHz.

Figure 25:
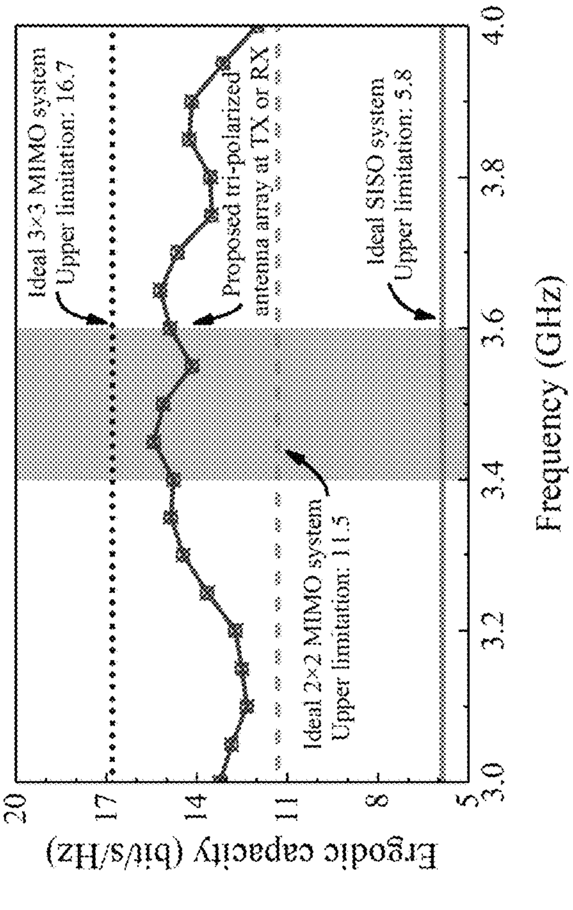
FIG. 25 is a graph showing calculated ergodic channel capacity of the multi-polarization antenna array of FIG. 14A/15A as a transmitting or receiving antenna for 3×3

ECCs (envelope correlation coefficient values) between every two ports in the array 1400 are calculated from the measured 3D patterns and it is found that they are all less than 0.05 across the operating band. Such a low ECC level means that that the antenna array 1400 in this embodiment can provide three nearly uncorrelated high-gain radiation patterns. The ergodic channel capacities of the antenna array 1400 in this embodiment in a 3×3 MIMO system are also calculated from the measured pattern, with an assumption of a 20 dB SNR. FIG. 25 shows the results along with the theoretical capacities of the ideal SISO system (5.8 bit/s/Hz), 2×2 MIMO system (11.5 bit/s/Hz), and 3×3 MIMO system (16.7 bit/s/Hz). As shown in FIG. 25, the channel capacity of the antenna array 1400 is more than 14.15 bit/s/Hz across the 3.5 GHz band and has a peak value of 15.5 bit/s/Hz at 3.45 GHz. It is noted that this channel capacity is lower than that of a single antenna (16.6 bit/s/Hz in FIG. 13). The difference is due to the fact that the total efficiency of the antenna array 1400 is lower than that of the antenna 200 (96%), which is mainly degraded by the mutual couplings.

For an ideal N×N MIMO system (N: number of antennas on both transmitting and receiving sides), the channel capacity is nearly proportional to N. This leads to a straightforward strategy of deploying more antennas to increase the channel capacity. However, more antennas usually require more space, which may not be desirable or available. Thus, it is necessary to also evaluate the area capacity (capacity per unit area) for MIMO antenna design in the above embodiments.

To do so, a metric called channel capacity density (CCD) is proposed in this disclosure to characterize the spatial multiplexing potential in an antenna system by considering the antenna footprint. Without CCD, it would be unfair to compare a multi-polarization antenna array with a single-polarization antenna array. In one embodiment, CCD is defined as follows:

$$CCD = \frac{\text{Channel capacity}}{\text{Antenna area}} \left(\text{bit/s/Hz}/\lambda_0^2\right)$$

where the antenna area is expressed in terms of wavelength square, $\lambda_0$ is the wavelength in the free space at the center operation frequency.

For a point-to-point wireless system, the tri-polarization antenna 200 can provide three quasi-orthogonal wireless channels, making it suitable or attractive for bandwidth-hungry applications. It is worth mentioning that tri-polarization antenna 200 has almost the same footprint as a single-polarization counterpart, which means that the design of the tri-polarization antenna 200 is efficient in terms of channel capacity. This merit can be seen from a newly defined term, CCD, which considers of the footprint of an antenna.

As shown in Table I below, the tri-polarization antenna 200 possesses a smallest footprint and has a channel capacity of more than 16.4 bit/s/Hz, which reaches 98% of an ideal 3×3 MIMO system. The CCD value of the tri-polarization antenna 200 is large because three independent channels are provided by the compact antenna. This can intuitively indicate that the tri-polarization antenna 200 can provide more channel capacity with the same footprint compared with some other tri-polarization antennas. Furthermore, the tri-polarization antennas 200 can not only be applied as a tri-polarization antenna to triple the data rate but also be used in array design. Based on the compact configuration and boresight radiation patterns of the tri-polarization antenna 200, a high-gain antenna array 1400 with three coplanar polarizations is also designed.

TABLE I

Some features of a tri-polarization antenna in one embodiment of the invention

| Operating modes | Radiation patterns | *Footprint ($\lambda_0^2$) | Tri-polarization type | Channel Capacity density (bit/s/Hz/$\lambda_0^2$) |
|---|---|---|---|---|
| Three monopole modes | Three quasi-boresight patterns | Circle, 0.30 (diameter) | Co-planar | >182.2 |

*The footprint is shown with diameter for circular shape where λ0 is the wavelength of center frequency in the free space (the size of the ground plane with feeding circuit is not included) in this footprint determination.

Some embodiments of the invention have provided a tri-polarization multiplexing scheme that can provide a nearly tripled channel capacity for a point-to-point wireless system, compared with a single-polarization counterpart with the same footprint. Tri-polarization scheme could be used for multiplexing purposes. However, there has been difficulties to arrange three coplanar polarizations with a compact antenna footprint due to the strong mutual couplings, which are inevitable for neighboring non-orthogonal radiating sources. In some embodiments of the invention, by employing a dielectric arrangement that provides dielectric-air boundary, e.g., to three or more antenna elements, a dielectric-loaded antenna with good isolations can be obtained. An antenna array can further be designed based on the dielectric-loaded antenna. Both the antenna and the antenna array in these embodiments are promising candidates when a higher data rate is required for a MIMO system.

Some embodiments of the invention have provided a compact dielectric-loaded antenna with three coplanar polarizations for MIMO applications. In one implementation, its footprint is only $0.30\lambda_0 \times 0.30\lambda_0$. In some implementations, a generally cylindrical dielectric block is employed to reduce mutual couplings among three monopole antenna elements, which are closely separated ($0.14\lambda_0$). The dielectric block can provide extra reflected paths for waves to effectively cancel out the direct-path wave, which helps to obtain high isolations. The dielectric block may also change the radiation pattern of the monopole antenna elements from omnidirectional to unidirectional. When equipping a 3×3 MIMO system with the antenna in these embodiments, a tripled data rate can be expected due to the polarization multiplexing.

Some embodiments of the invention have provided an antenna with a compact footprint, and hence can be used to build a high-gain tri-polarization antenna array suitable or desirable for long-distance point-to-point communications. In such a MIMO antenna array, the inter-module mutual coupling is another challenge to fix. Some embodiments of the invention address this challenge by suing a further dielectric arrangement, e.g., with dielectric-filled slots suitably shaped, sized, and disposed, to reduce the inter-module coupling in the antenna array. In some embodiments, the decoupling slots are etched on the ground plane for the antennas of the array and so backside radiations are inevitably quite strong. Some embodiments of the invention address the undesirable back lobes by using an artificial magnetic conductor (AMC) arrangement underneath the ground plane of the antennas. As a result, in these embodiments, three directional radiation patterns with three polarization senses can be obtained from the antenna array. By utilizing polarization multiplexing, the antenna array in these embodiments can provide almost tripled channel capacity compared with a single polarized one.

It will be appreciated by persons skilled in the art that numerous variations and/or modifications may be made to the invention as shown in the specific embodiments to provide other embodiments of the invention. The described embodiments of the invention should therefore be considered in all respects as illustrative, not restrictive. Some embodiments of the invention may include one or more of these optional features (some of which are not specifically illustrated in the drawings). Some embodiments of the invention may lack one or more of these optional features (some of which are not specifically illustrated in the drawings). In some embodiments, the construction of the antenna and the antenna array may be different from those illustrated. For example, the dielectric arrangement/member/block, the antenna elements, the dielectric members of the decoupling mechanism, etc., of the antenna and the antenna array can be of different shapes, sizes, forms, etc. than those illustrated. The antenna elements in the antenna can be dipole elements, slots, patch elements, etc., not necessarily monopole elements. The separation of the antenna elements of the antenna can be adjusted based on needs. In some embodiments, the dielectric constant(s), or effective dielectric constant(s), of the dielectric arrangement/member/block/elements, etc., of the antenna and the antenna array can be different from the values illustrated. In some embodiments, the antenna or the antenna array can be arranged to operate in different frequency or frequencies (range(s)/band(s)), i.e., not limited to the illustrated frequency or frequencies (3.5 GHz band). For example, the antenna array can have different array arrangements or configurations such as triangular, polygonal, etc. The radiation patterns produced by the antenna and the antenna array can be different from those specifically illustrated. The antenna array can be used as part of (e.g., a sub-array) of a larger antenna array. The antenna and antenna array can be applied in MIMO systems, e.g., MIMO communication systems (electronic devices, base stations, etc.).

The invention claimed is:

1. A multi-polarization antenna, comprising:

a plurality of antenna elements; and a dielectric arrangement operably coupled with the plurality of antenna elements;

wherein the dielectric arrangement is arranged to cooperate with the plurality of antenna elements to (i) facilitate transmission and/or receive of, at least, electromagnetic waves with a first polarization, electromagnetic waves with a second polarization different from the first polarization, and electromagnetic waves with a third polarization different from the first polarization and the second polarization, and (ii) reduce, limit, and/or eliminate mutual coupling between at least some of the plurality of antenna elements during operation;

wherein the first, second, and third polarizations are non-orthogonal.

2. The multi-polarization antenna of claim 1, wherein the first, second, and third polarizations are generally co-planar.

3. The multi-polarization antenna of claim 2, wherein the first, second, and third polarizations are spaced apart by about 120 degrees.

4. The multi-polarization antenna of claim 1, wherein the plurality of antenna elements comprise, at least, a first antenna element, a second antenna element, and a third antenna element;

wherein the dielectric arrangement is arranged to:

cooperate with the first antenna element to facilitate transmission and/or receive of electromagnetic waves with the first polarization;

cooperate with the second antenna element to facilitate transmission and/or receive of electromagnetic waves with the second polarization;

cooperate with the third antenna element to facilitate transmission and/or receive of electromagnetic waves with the third polarization; and reduce, limit, and/or eliminate mutual coupling between at least two or any two of the first, second, and third antenna elements.

5. The multi-polarization antenna of claim 4, wherein the dielectric arrangement comprises a dielectric member surrounding or receiving each of the plurality of antenna elements.

6. The multi-polarization antenna of claim 5, wherein the dielectric member comprises a plurality of openings each at least partly surrounding or receiving a respective one of the plurality of antenna elements.

7. The multi-polarization antenna of claim 5, further comprising a ground plane, and wherein the dielectric member is arranged on the ground plane and each of the plurality of antenna elements extend generally perpendicular to the ground plane.

8. The multi-polarization antenna of claim 4, wherein the plurality of antenna elements are arranged on and angularly spaced apart on an imaginary circle.

9. The multi-polarization antenna of claim 8, wherein the plurality of antenna elements angularly spaced apart generally equally.

10. The multi-polarization antenna of claim 8, wherein the dielectric arrangement comprises a generally cylindrical dielectric block with a plurality of openings each at least partly surrounding or receiving a respective one of the plurality of antenna elements; and wherein the imaginary circle and a further imaginary circle defined by a base of the generally cylindrical dielectric block are generally concentric.

11. The multi-polarization antenna of claim 10, wherein the generally cylindrical dielectric block has a diameter in a range of about $0.3\lambda_0$ to about $0.6\lambda_0$, where $\lambda_0$ is wavelength of center operation frequency of the multi-polarization antenna in free space.

12. The multi-polarization antenna of claim 4, wherein the first antenna element comprises a monopole element arranged to operate in one or more monopole modes;

wherein the second antenna element comprises a monopole element arranged to operate in one or more monopole modes; and/or wherein the third antenna element comprises a monopole element arranged to operate in one or more monopole modes.

13. The multi-polarization antenna of claim 12, wherein the one or more monopole modes of the first antenna element comprises at least one of a quarter-wavelength monopole mode and a half-wavelength monopole mode;

wherein the one or more monopole modes of the second antenna element comprises at least one of a quarter-wavelength monopole mode and a half-wavelength monopole mode; and wherein the one or more monopole modes of the third antenna element comprises at least one of a quarter-wavelength monopole mode and a half-wavelength monopole mode.

14. The multi-polarization antenna of claim 4, further comprising a feed arrangement operably coupled with the plurality of antenna elements, the feed arrangement comprising a plurality of feeds each operably coupled with a respective one of the plurality of antenna elements.

15. The multi-polarization antenna of claim 14, wherein the plurality of feeds are selectively and/or independently operable; and/or wherein at least two of the plurality of feeds are simultaneously operable.

16. A multi-input-multi-output (MIMO) system comprising at least one of the multi-polarization antenna of claim 1.

* * * * *